United States Patent
Go et al.

(10) Patent No.: US 11,950,189 B2
(45) Date of Patent: Apr. 2, 2024

(54) METHOD AND APPARATUS FOR UPLINK TRANSMISSION AND RECEPTION IN WIRELESS COMMUNICATION SYSTEM

(71) Applicant: LG ELECTRONICS INC., Seoul (KR)

(72) Inventors: Seongwon Go, Seoul (KR); Hyungtae Kim, Seoul (KR); Jiwon Kang, Seoul (KR); Haewook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/161,362

(22) Filed: Jan. 30, 2023

(65) Prior Publication Data

US 2023/0171705 A1    Jun. 1, 2023

Related U.S. Application Data

(63) Continuation of application No. PCT/KR2021/009704, filed on Jul. 27, 2021.

(30) Foreign Application Priority Data

Aug. 7, 2020   (KR) .................. 10-2020-0099452

(51) Int. Cl.
*H04W 72/23* (2023.01)
*H04W 52/08* (2009.01)
*H04W 52/14* (2009.01)

(52) U.S. Cl.
CPC ......... *H04W 52/146* (2013.01); *H04W 52/08* (2013.01); *H04W 72/23* (2023.01)

(58) Field of Classification Search
CPC ... H04W 52/146; H04W 52/36; H04W 52/10; H04W 52/08; H04W 74/0866;
(Continued)

(56) References Cited

U.S. PATENT DOCUMENTS

2012/0208583 A1\*  8/2012  Chung .................. H04W 52/34
                                                            455/509
2015/0201382 A1     7/2015  Wang et al.
(Continued)

FOREIGN PATENT DOCUMENTS

KR    10-2019-0139849    12/2019
WO    2020-026425         2/2020
(Continued)

OTHER PUBLICATIONS

PCT International Application No. PCT/KR2021/009704, International Search Report dated Nov. 2, 2021, 6 pages.
(Continued)

*Primary Examiner* — Wei Zhao
(74) *Attorney, Agent, or Firm* — LEE, HONG, DEGERMAN, KANG & WAIMEY

(57) ABSTRACT

Disclosed are a method and an apparatus for uplink transmission and reception in a wireless communication system. A method for transmitting an uplink channel according to an embodiment of the present disclosure may comprise the steps of: receiving downlink control information (DCI) from a base station; and transmitting the uplink channel to the base station on the basis of the DCI. N (N is a natural number) transmit power control (TCI) command values may be indicated by the DCI, and transmission power of the uplink channel may be determined on the basis of one of the N TPC command values.

16 Claims, 12 Drawing Sheets

(58) Field of Classification Search
CPC ........... H04W 72/042; H04W 72/0446; H04W 72/046; H04W 72/044; H04B 7/0695; H04L 5/0051
See application file for complete search history.

(56) References Cited

U.S. PATENT DOCUMENTS

| | | | | |
|---|---|---|---|---|
| 2020/0119799 | A1* | 4/2020 | Jung | H04W 52/36 |
| 2021/0259000 | A1* | 8/2021 | Khoshnevisan | H04L 5/0048 |
| 2022/0095083 | A1* | 3/2022 | Yeo | H04W 4/06 |

FOREIGN PATENT DOCUMENTS

| | | |
|---|---|---|
| WO | 2020-030038 | 2/2020 |
| WO | 2020-092260 | 5/2020 |

OTHER PUBLICATIONS

Korean Intellectual Property Office Application No. 10-2023-7001945, Notice of Allowance dated Aug. 4, 2023, 2 pages.
ZTE, Sanechips, "Remaining issues on NR power control in non-CA aspects", R1-1803916, 3GPP TSG RAN WG1 Meeting #92bis, Apr. 2018, 10 pages.

* cited by examiner (a)

(b)

METHOD AND APPARATUS FOR UPLINK TRANSMISSION AND RECEPTION IN WIRELESS COMMUNICATION SYSTEM

CROSS-REFERENCE TO RELATED APPLICATIONS

This application is a continuation of International Application No. PCT/KR2021/009704, filed on Jul. 27, 2021, which claims the benefit of earlier filing date and right of priority to Korean Application No. 10-2020-0099452, filed on Aug. 7, 2020, the contents of which are all hereby incorporated by reference herein in their entireties.

TECHNICAL FIELD

The present disclosure relates to a wireless communication system, and in more detail, relates to a method and an apparatus for uplink transmission and reception in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical object of the present disclosure is to provide a method and an apparatus of transmitting and receiving an uplink channel and/or signal.

In addition, an additional technical object of the present disclosure is to provide a method and an apparatus of controlling transmit power when transmitting and receiving an uplink channel and/or signal.

In addition, an additional technical object of the present disclosure is to provide a method and an apparatus of transmitting and receiving uplink channels and/or signals for multiple transmission and reception points (TRPs) in a wireless communication system supporting multiple TRPs.

In addition, an additional technical object of the present disclosure is to provide a method and an apparatus of controlling transmission power when transmitting and receiving uplink channels and/or signals for multiple transmission and reception points (TRPs) in a wireless communication system supporting multiple TRPs.

The technical objects to be achieved by the present disclosure are not limited to the above-described technical objects, and other technical objects which are not described herein will be clearly understood by those skilled in the pertinent art from the following description.

A method of transmitting an uplink channel in a wireless communication system may include receiving downlink control information (DCI) from a base station; and transmitting the uplink channel to the base station based on the DCI. N (N is a natural number) transmit power control (TPC) command values may be indicated by the DCI and transmit power of the uplink channel may be determined based on any one of the N TPC command values.

A method of receiving an uplink channel according to an additional aspect of the present disclosure may include transmitting downlink control information (DCI) to a terminal; and receiving the uplink channel based on the DCI from the terminal. N (N is a natural number) transmit power control (TPC) command values may be indicated by the DCI and transmit power of the uplink channel may be determined based on any one of the N TPC command values.

According to an embodiment of the present disclosure, transmit power may be controlled when transmitting and receiving an uplink channel and/or signal.

According to an embodiment of the present disclosure, transmission of uplink channels and/or signals for multiple transmission and reception points (TRPs) may be supported in a wireless communication system supporting multiple TRPs.

In addition, according to an embodiment of the present disclosure, when transmitting uplink channels and/or signals for multiple transmission and reception points (TRPs) in a wireless communication system supporting multiple TRPs, transmit power of uplink channels and/or signals may be individually (independently) determined.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
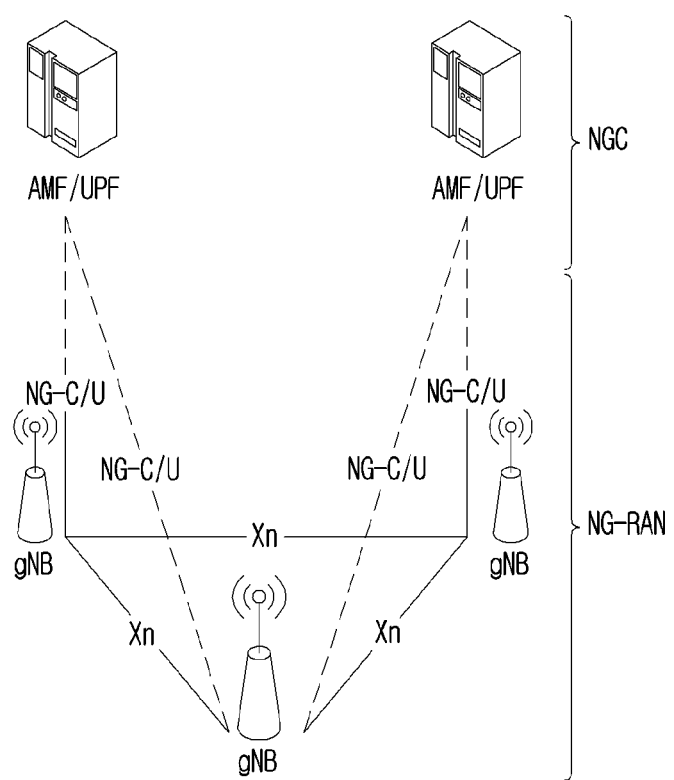
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS(Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information—reference signal resource indicator
CSI: channel state information
CSI-IM: channel state information—interference measurement
CSI-RS: channel state information—reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power
Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
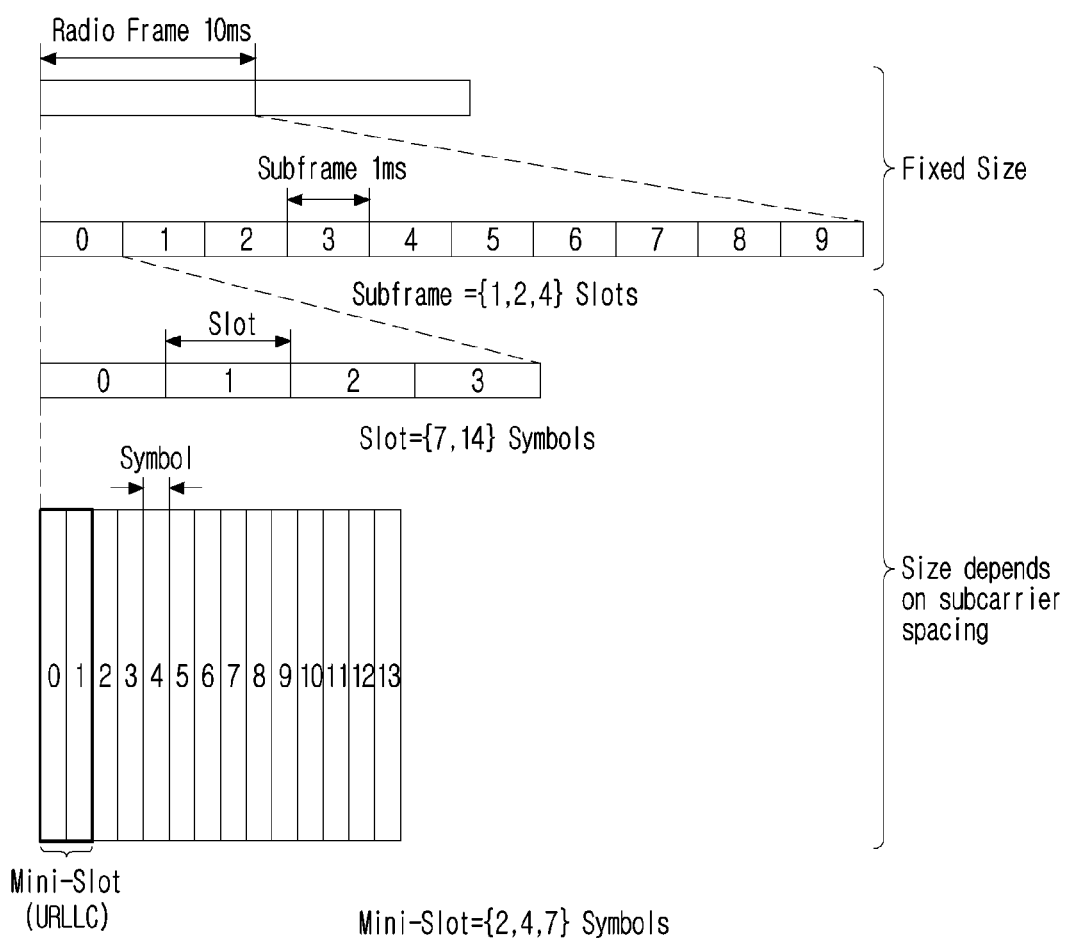
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is 480·103 Hz and $N_f$ is 4096. Downlink and uplink transmission is configured (organized) with a radio frame having a duration of $T_f=1/(\Delta f_{max} N_f/100) \cdot T_c=10$ ms. Here, a radio frame is configured with 10 subframes having a duration of $T_{sf}=(\Delta f_{max} N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA} \pm N_{TA,offset})$ than a corresponding downlink frame in a corresponding terminal starts. For a subcarrier spacing configuration μ, slots are numbered in an increasing order of $n_s^\mu \in \{0, \ldots, N_{slot}^{subframe,\mu}-1\}$ in a subframe and are numbered in an increasing order of $n_{s,f}^\mu \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
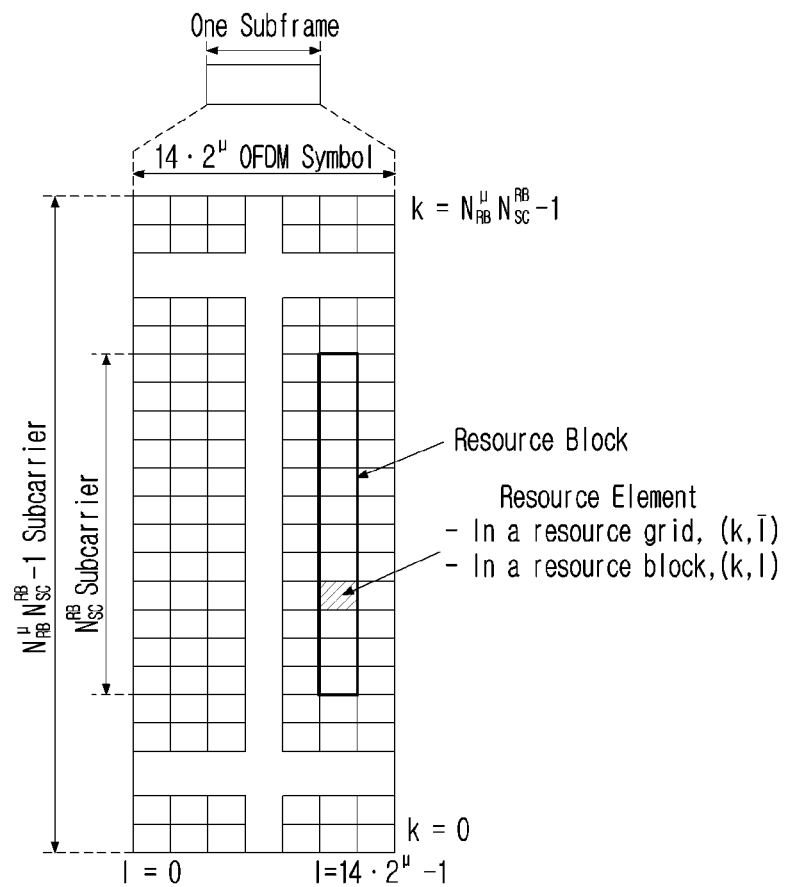
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^\mu N_{sc}^{RB}$ subcarriers in a frequency domain and one subframe is configured with $14 \cdot 2^\mu$ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu < N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, $k=0, \ldots, N_{RB}^\mu N_{sc}^{RB}-1$ is an index in a frequency domain and $l'=0, \ldots, 2^\mu N_{symb}^{(\mu)}-1$ refers to a position of a symbol in a subframe. When referring to a resource element in a slot, an index pair (k,l) is used. Here, $l=0, \ldots, N_{symb}^\mu-1$. A resource element (k,l') for μ and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^\mu$ and a resource element (k,l) for a subcarrier spacing configuration μ in a frequency domain is given as in the following Equation 1.

$$n^{\mu}_{CRB} = \left\lfloor \frac{k}{N^{RB}_{sc}} \right\rfloor \qquad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n^{\mu}_{CRB} = n^{\mu}_{PRB} + N^{start,\mu}_{BWP,i} \qquad \text{[Equation 2]}$$

$N_{BWP,i}^{start,\mu}$ is a common resource block that a BWP starts relatively to common resource block 0.

Figure 4:
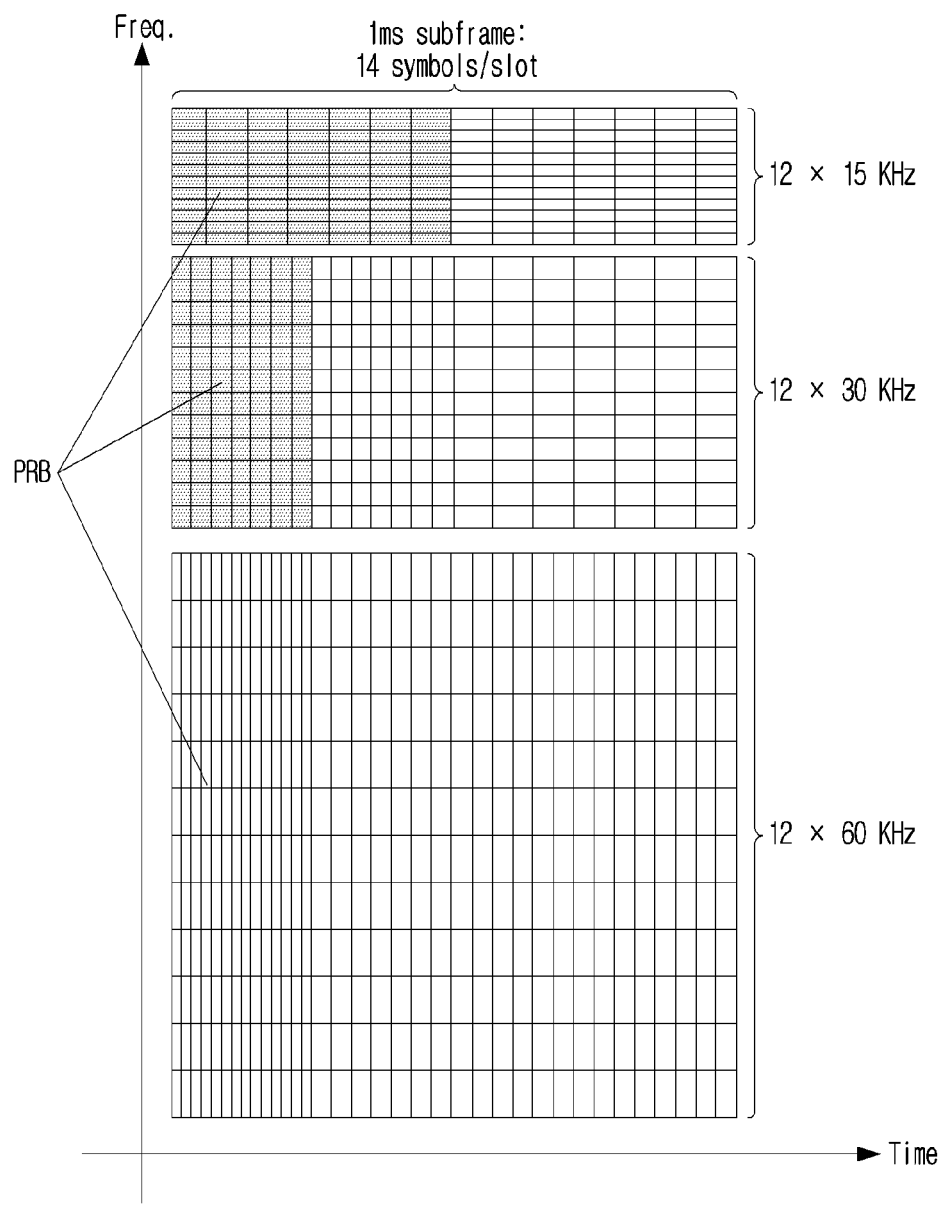
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
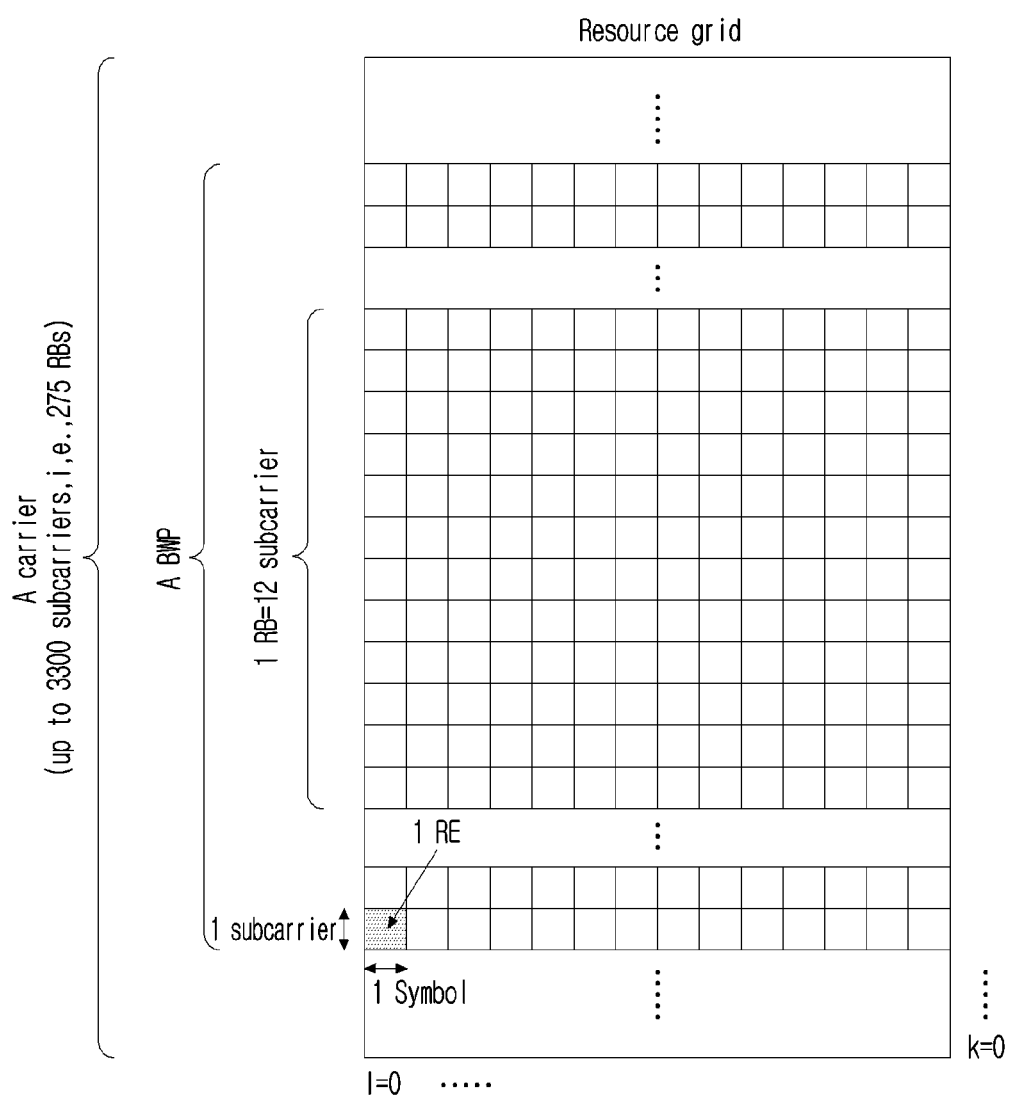
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
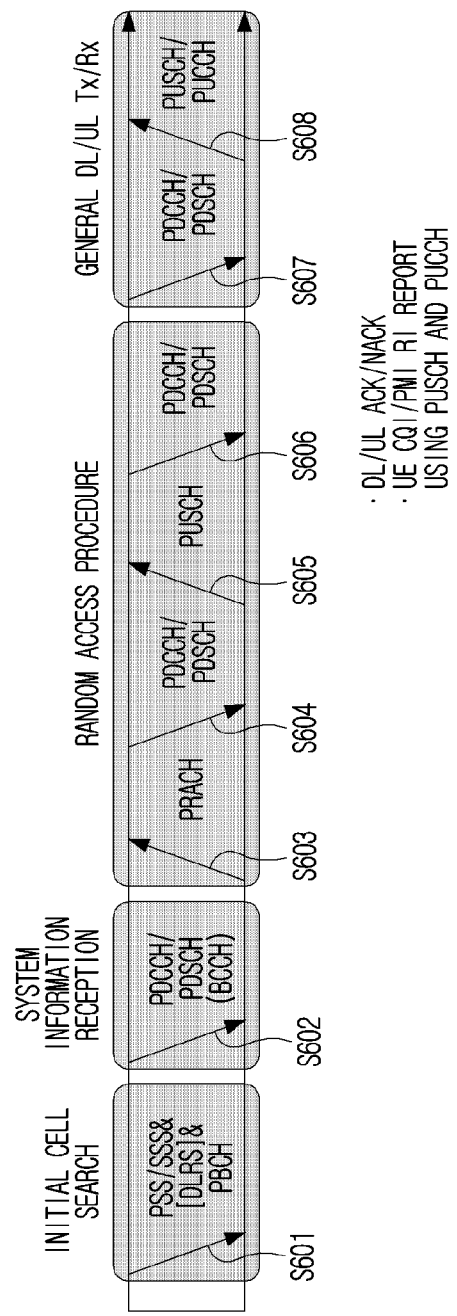
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MC S-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MC S-C-RNTI and transmitted.

Next, DCI formats 1_0, 1_1 and 1_2 may include resource information (e.g., frequency resource allocation, time resource allocation, VRB (virtual resource block)—PRB (physical resource block) mapping, etc.), information related to a transport block (TB)(e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MC S-C-RNTI and transmitted.

DCI format 1_1 is used for scheduling of a PDSCH in one cell. Information included in DCI format 1_1 is CRC scrambled by a C-RNTI or a CS-RNTI or a MC S-C-RNTI and transmitted.

DCI format 1_2 is used for scheduling of a PDSCH in one cell. Information included in DCI format 1_2 is CRC scrambled by a C-RNTI or a CS-RNTI or a MC S-C-RNTI and transmitted.

Uplink Power Control

It may be necessary to increase or decrease transmission power of a terminal (e.g., user equipment (UE) and/or a mobile device) according to a situation in a wireless communication system. As such, controlling transmission power of a terminal and/or a mobile device may be referred to as uplink power control. In an example, a method of controlling transmission power may be applied to satisfy requirements of a base station (e.g., gNB, eNB, etc.) (e.g., a SNR (Signal-to-Noise Ratio), a BER (Bit Error Ratio), a BLER (Block Error Ratio), etc.).

Power control as described above may be performed by an open-loop power control method and a closed-loop power control method.

Specifically, an open-loop power control method means a method of controlling transmission power without a feedback from a transmission device (e.g., a base station, etc.) to a reception device (e.g., a terminal, etc.) and/or a feedback from a reception device to a transmission device. In an example, a terminal may receive a specific channel/signal (a pilot channel/signal) from a base station and estimate strength of reception power by using it. Subsequently, a terminal may control transmission power by using strength of an estimated reception power.

Unlike it, a closed-loop power control method means a method of controlling transmission power based on a feedback from a transmission device to a reception device and/or a feedback from a reception device to a transmission device. In an example, a base station receives a specific channel/signal from a terminal and determines the optimum power level of a terminal based on a power level measured by a received specific channel/signal, SNR, BER, BLER, etc. A base station delivers information on a determined optimum power level (i.e., a feedback) to a terminal through a control channel, etc. and a corresponding terminal may control transmission power by using a feedback provided by a base station.

Hereinafter, a power control method for cases in which a terminal and/or a mobile device performs uplink transmission to a base station in a wireless communication system will be described specifically.

Specifically, hereinafter, power control methods for 1) uplink data channel (e.g., a PUSCH (Physical Uplink Shared Channel)), 2) uplink control channel (e.g., a PUCCH (Physical Uplink Control Channel)), 3) sounding reference signal (SRS), 4) random access channel (e.g., a PRACH (Physical Random Access Channel)) transmission are described. Here, a transmission occasion for a PUSCH, a PUCCH, an SRS and/or a PRACH (i.e., a transmission time unit) (i) may be defined by a slot index (n_s) in a frame of a system frame number (SFN), a first symbol (S) in a slot, the number (L) of consecutive symbols, etc.

Hereinafter, for convenience of a description, a power control method is described based on a case in which a terminal performs PUSCH transmission. Of course, a corresponding method may be extended and applied to other uplink data channel supported in a wireless communication system.

For PUSCH transmission in an active UL bandwidth part (UL BWP) of a carrier (f) of a serving cell (c), a terminal may calculate a linear power value of transmission power determined by the following Equation 3. Subsequently, a corresponding terminal may control transmission power by considering the number of antenna ports and/or the number of SRS ports, etc. for a calculated linear power value.

Specifically, when a terminal performs PUSCH transmission in an active UL BWP (b) of a carrier (f) of a serving cell (c) by using a parameter set configuration based on index j and a PUSCH power control adjustment state based on index 1, a terminal may determine PUSCH transmission power $P_{PUSCH,b,f,c}(i,j,q_d,1)$(dBm) at a PUSCH transmission occasion (i) based on the following Equation 3.

or fractional pathloss compensation may be performed. In this case, the alpha value may be configured by considering interference and/or a data rate, etc. between terminals. In addition, $P_{CMAX,f,c}(i)$ may represent configured UE transmit power. In an example, the configured UE transmit power may be interpreted as 'configured maximum UE output power' defined in 3GPP TS 38.101-1 and/or TS38.101-2. In addition, $M_{RB,b,f,c}^{PUSCH}$ may represent bandwidth of PUSCH resource allocation expressed as the number of resource blocks (RB) for a PUSCH transmission occasion based on a subcarrier spacing (p). In addition, $f_{b,f,c}(i,1)$ related to a PUSCH power control adjustment state may be configured or indicated based on a transmit power control (TPC) command field of DCI (e.g., DCI format 0_0, DCI format 0_1, DCI format 2_2, DCI format2_3, etc.).

In this case, a specific RRC (Radio Resource Control) parameter (e.g., SRI-PUSCHPowerControl-Mapping, etc.) may represent a linkage between an SRI (SRS Resource Indicator) field of DCI (downlink control information) and the above-described index j, q_d, 1. In other words, the

[Equation 3]

$$P_{PUSCHb,f,c}(i, j, q_d, l) = \min\begin{Bmatrix} P_{CMAX,f,c}(i), \\ P_{O\_PUSCHb,f,c}(j) + 10\log_{10}(2^\mu \cdot M_{RBb,f,c}^{PUSCH}(i)) + \alpha_{b,f,c}(j) \cdot PL_{b,f,c}(q_d) + \\ \Delta_{TFb,f,c}(i) + f_{b,f,c}(i, l) \end{Bmatrix}$$

In Equation 3, index j represents an index for an open-loop power control parameter (e.g., $P_O$, alpha ($\alpha$), etc.) and up to 32 parameter sets may be configured per cell. Index q_d represents an index of a DL RS resource for pathloss (PL) measurement (e.g., $PL_{b,f,c}(q_d)$) and up to 4 measured values may be configured per cell. Index I represents an index for a closed-loop power control process and up to 2 processes may be configured per cell.

Specifically, as $P_O$ (e.g., $P_{O\_PUSCH,b,f,c}(j)$) is a parameter which is broadcast as part of system information, it may represent target reception power from reception. A corresponding $P_O$ value may be configured by considering throughput of a terminal, capacity of a cell, noise and/or interference, etc. In addition, alpha (e.g., $\alpha_{b,f,c}(j)$) may represent a ratio which performs compensation for pathloss. Alpha may be configured as a value from 0 to 1 and according to a configured value, full pathloss compensation above-described index j, 1, q_d, etc. may be associated with a beam, a panel and/or a spatial domain transmission filter, etc. based on specific information. Thereby, PUSCH transmission power control in a unit of a beam, a panel and/or a spatial domain transmission filter may be performed.

Parameters and/or information for the above-described PUSCH power control may be configured individually (i.e., independently) per BWP. In this case, corresponding parameters and/or information may be configured or indicated by higher layer signaling (e.g., RRC signaling, a MAC-CE (Medium Access Control-Control Element), etc.) and/or DCI, etc. In an example, a parameter and/or information for PUSCH power control may be transmitted through RRC signaling PUSCH-ConfigCommon, PUSCH-PowerControl, etc. and PUSCH-ConfigCommon, PUSCH-PowerControl may be configured as in the following table 6.

TABLE 6

```
PUSCH-ConfigCommon ::=            SEQUENCE {
    groupHoppingEnabledTransformPrecoding ENUMERATED {enabled}
    pusch-TimeDomainAllocationList    PUSCH-TimeDomainResourceAllocationList
    msg3-DeltaPreamble                INTEGER (-1..6)
    p0-NominalWithGrant               INTEGER (-202..24)
    ...
PUSCH-PowerControl ::=            SEQUENCE {
    tpc-Accumulation                  ENUMERATED { disabled }
    msg3-Alpha                        Alpha
    p0-Nominal WithoutGrant           INTEGER (-202..24)
    p0-AlphaSets                      SEQUENCE (SIZE (1..maxNrofP0-PUSCH-AlphaSets))
OF P0-PUSCH-AlphaSet
    pathlossReferenceRSToAddModList SEQUENCE (SIZE (1..maxNrofPUSCH-
PathlossReferenceRSs)) OF PUSCH-PathlossReferenceRS
    pathlossReferenceRSToReleaseList SEQUENCE (SIZE (1..maxNrofPUSCH-
PathlossReferenceRSs)) OF PUSCH-PathlossReferenceRS-Id
        twoPUSCH-PC-AdjustmentStates    ENUMERATED {twoStates}
        deltaMCS                        ENUMERATED {enabled}
        sri-PUSCH-MappingToAddModList    SEQUENCE (SIZE (1..maxNrofSRI-PUSCH-
Mappings)) OF SRI-PUSCH-PowerControl
```

TABLE 6-continued

| | |
|---|---|
| sri-PUSCH-MappingToReleaseList | SEQUENCE (SIZE (1..maxNrofSRI-PUSCH-Mappings)) OF SRI-PUSCH-PowerControlId |
| } | |

Through a method as described above, a terminal may determine or calculate PUSCH transmission power and transmit a PUSCH by using determined or calculated PUSCH transmission power. Hereinafter, for convenience of a description, a power control method is described based on a case in which a terminal performs PUSCH transmission. Of course, a corresponding method may be extended and applied to other uplink control channel supported in a wireless communication system.

Specifically, when a terminal performs PUCCH transmission in an active UL BWP (b) of a carrier (f) of a primary cell (or a secondary cell)(c) by using a PUCCH power control adjustment state based on index 1, a terminal may determine PUCCH transmission power $P_{PUCCH,b,f,c}(i,q_u,q_d,l)$(dBm) at a PUCCH transmission occasion (i) based on the following Equation 4.

transmission occasion based on a subcarrier spacing (p). In addition, a delta function (e.g., $\Delta_{F\_PUCCH}(F)$, $\Delta_{TF,b,f,c}(i)$) may be configured by considering a PUCCH format (e.g., PUCCH formats 0, 1, 2, 3, 4, etc.). In addition, $g_{b,f,c}(i,1)$ related to a PUCCH power control adjustment state may be configured or indicated based on a TPC command field of DCI (e.g., DCI format 1_0, DCI format 1_1, DCI format 2_2, etc.) received or detected by a terminal.

In this case, a specific RRC parameter (e.g., PUCCH-SpatialRelationInfo, etc.) and/or a specific MAC-CE command (e.g., PUCCH spatial relation Activation/Deactivation, etc.) may be used to activate or deactivate a linkage between a PUCCH resource and the above-described index q_u, q_d, 1. In an example, a PUCCH spatial relation Activation/Deactivation command in MAC-CE may activate or deactivate a linkage between a PUCCH resource and

[Equation 4]

$$P_{PUCCH,b,f,c}(i, q_u, q_d, l) = \min \begin{Bmatrix} P_{CMAX,f,c}(i), \\ P_{O\_PUCCH,b,f,c}(q_u) + 10\log_{10}\left(2^\mu \cdot M_{RB,b,f,c}^{PUCCH}(i)\right) + PL_{b,f,c}(q_d) + \Delta_{F\_PUCCH}(F) + \\ \Delta_{TF,b,f,c}(i) + g_{b,f,c}(i, l) \end{Bmatrix}$$

In Equation 4, q_d represents an index for an open-loop power control parameter (e.g., $P_O$, etc.) and up to 8 parameter values may be configured per cell. Index q_d represents an index of a DL RS resource for pathloss (PL) measurement (e.g., $PL_{b,f,c}(q_d)$) and up to 4 measured values may be configured per cell. Index 1 represents an index for a closed-loop power control process and up to 2 processes may be configured per cell.

Specifically, as $P_O$ (e.g., $P_{O\_PUCCH,b,f,c}(q_u)$ is a parameter which is broadcast as part of system information, it may represent target reception power from reception. A corresponding $P_O$ value may be configured by considering throughput of a terminal, capacity of a cell, noise and/or interference, etc. In addition, $P_{CMAX,f,c}(i)$ may represent configured UE transmit power. In an example, the configured UE transmit power may be interpreted as 'configured maximum UE output power' defined in 3 GPP TS 38.101-1 and/or TS38.101-2. In addition, $M_{RB,b,f,c}^{PUCCH}(i)$ may represent bandwidth of PUCCH resource allocation expressed as the number of resource blocks (RB) for a PUCCH the above-described index q_u, q_d, 1 based on a RRC parameter, PUCCH-SpatialRelationInfo. In other words, the above-described index q_u, q_d, 1, etc. may be associated with a beam, a panel and/or a spatial domain transmission filter, etc. based on specific information. Thereby, PUCCH transmission power control in a unit of a beam, a panel and/or a spatial domain transmission filter may be performed.

Parameters and/or information for the above-described PUCCH power control may be configured individually (i.e., independently) per BWP. In this case, corresponding parameters and/or information may be configured or indicated by higher layer signaling (e.g., RRC signaling, MAC-CE, etc.) and/or DCI, etc. In an example, a parameter and/or information for PUCCH power control may be transmitted through RRC signaling PUCCH-ConfigCommon, PUCCH-PowerControl, etc. and PUCCH-ConfigCommon, PUCCH-PowerControl may be configured as in the following table 7.

TABLE 7

| | |
|---|---|
| PUCCH-ConfigCommon ::= | SEQUENCE { |
| pucch-ResourceCommon | INTEGER (0..15) |
| pucch-GroupHopping | ENUMERATED { neither, enable, disable }, |
| hoppingId | INTEGER (0..1023) |
| p0-nominal | INTEGER (−202..24) |
| ... | |
| } | |
| PUCCH-PowerControl ::= | SEQUENCE { |
| deltaF-PUCCH-f0 | INTEGER (−16..15) |
| deltaF-PUCCH-f1 | INTEGER (−16..15) |
| deltaF-PUCCH-f2 | INTEGER (−16..15) |
| deltaF-PUCCH-f3 | INTEGER (−16..15) |
| deltaF-PUCCH-f4 | INTEGER (−16..15) |
| p0-Set | SEQUENCE (SIZE (1..maxNrofPUCCH-P0-PerSet)) OF P0- |

TABLE 7-continued

```
PUCCH
    pathlossReferenceRSs        SEQUENCE (SIZE (1..maxNrofPUCCH-
PathlossReferenceRSs)) OF PUCCH-PathlossReferenceRS
    twoPUCCH-PC-AdjustmentStates    ENUMERATED {twoStates}
    ...
}
P0-PUCCH ::=                SEQUENCE {
    p0-PUCCH-Id             P0-PUCCH-Id,
    p0-PUCCH-Value          INTEGER (-16..15)
}
P0-PUCCH-Id ::=             INTEGER (1..8)
PUCCH-PathlossReferenceRS ::=   SEQUENCE {
    pucch-PathlossReferenceRS-Id    PUCCH-PathlossReferenceRS-Id,
    referenceSignal         CHOICE {
        ssb-Index               SSB-Index,
        csi-RS-Index            NZP-CSI-RS-ResourceId
    }
}
```

Through a method as described above, a terminal may determine or calculate PUCCH transmission power and transmit a PUCCH by using determined or calculated PUCCH transmission power.

Regarding transmission of a sounding reference signal (SRS) in an activated UL BWP of a carrier f of a serving cell c, a terminal may calculate a linear power value of transmit power determined by Equation 5 below. Thereafter, a terminal may control transmit power by equally dividing the calculated linear power value for antenna port(s) configured for an SRS.

Specifically, when a terminal perform SRS transmission in an activated UL BWP b of a carrier f of a serving cell c by using an SRS power control adjustment state based on an index 1, the terminal may determine the SRS transmission power $P_{SRS,b,f,c}(i,q_s,1)$(dBm) at an SRS transmission occasion i based on Equation 5 below.

compensation or fractional pathloss compensation may be performed according to the configured value. In this case, the alpha value may be configured in consideration of interference between terminals and/or data rate. In addition, $P_{CMAX,f,c}(i)$ may indicate the configured terminal transmission power. As an example, the configured terminal transmit power may be interpreted as 'configured maximum UE output power' defined in 3 GPP TS 38.101-1 and/or TS38.101-2. In addition, $M_{SRS,b,f,c}(i)$ may indicate a bandwidth of SRS resource allocation expressed as a number of resource blocks (RBs) for an SRS transmission occasion based on subcarrier spacing (μ). In addition, $h_{b,f,c}(i,1)$ related to an SRS power control adjustment state may be configured or indicated based on a TPC command field of DCI (e.g. DCI format 2_3, etc.) received or detected by a terminal and/or RRC parameter (e.g., srs-PowerControlAdjustment-States, etc.).

$$P_{SRS,b,f,c}(i, q_s, l) = \min\begin{Bmatrix} P_{CMAX,f,c}(i), \\ P_{O\_SRS,b,f,c}(q_s) + 10\log_{10}(2^\mu \cdot M_{SRS,b,f,c}(i)) + \\ \alpha_{SRS,b,f,c}(q_s) \cdot PL_{b,f,c}(q_d) + h_{b,f,c}(i, l) \end{Bmatrix}$$ [Equation 5]

In Equation 5, q_s represents an index for an open-loop power control parameter (e.g., $P_O$, alpha (α), a DL RS resources for path loss (PL) measurements (e.g., $PL_{b,f,c}(q_d)$), etc.), and may be configured for each SRS resource set. Index I represents an index for a closed loop power control process, and a corresponding index may be configured independently of or in association with a PUSCH. If SRS power control is not associated with a PUSCH, a maximum number of closed loop power control processes for an SRS may be one.

Specifically, $P_O$ (e.g., $P_{O\_SRS,b,f,c}(q_s)$) is a parameter which is broadcasted as part of system information and may indicate target received power at a receiving side. The corresponding $P_O$ value may be configured in consideration of terminal throughput, cell capacity, noise and/or interference. In addition, alpha (e.g., $\alpha_{SRS,b,f,c}(q_s)$) may indicate a ratio for performing compensation for path loss. Alpha may be configured to a value from 0 to 1, and full pathloss A resource for SRS transmission may be applied as a reference for a base station and/or a terminal to determine a beam, panel, and/or spatial domain transmission filter, considering this point, SRS transmit power control may be performed in units of beams, panels, and/or space domain transmit filters.

Parameters and/or information for the above-described SRS power control may be individually (i.e., independently) configured for each BWP. In this case, the corresponding parameters and/or information may be configured or indicated through higher layer signaling (e.g., RRC signaling, MAC-CE, etc.) and/or DCI. As an example, parameters and/or information for SRS power control may be transmitted through RRC signaling, such as SRS-Config, SRS-TPC-CommandConfig, etc., and SRS-Config and SRS-TPC-CommandConfig are configured as shown in Table 8 below.

TABLE 8

```
SRS-Config ::=              SEQUENCE {
    srs-ResourceSetToReleaseList    SEQUENCE (SIZE(1..maxNrofSRS-ResourceSets))
OF SRS-ResourceSetId
    srs-ResourceSetToAddModList             SEQUENCE (SIZE(1..maxNrofSRS-
ResourceSets)) OF SRS-ResourceSet
    srs-ResourceToReleaseList       SEQUENCE (SIZE(1..maxNrofSRS-Resources)) OF
SRS-ResourceId
    srs-ResourceToAddModList        SEQUENCE (SIZE(1..maxNrofSRS-Resources))
OF SRS-Resource
    tpc-Accumulation            ENUMERATED {disabled}
    ...
}
SRS-ResourceSet ::=         SEQUENCE {
    srs-ResourceSetId           SRS-ResourceSetId,
    srs-ResourceIdList          SEQUENCE (SIZE(1..maxNrofSRS-ResourcesPerSet))
OF SRS-ResourceId
    resourceType                CHOICE {
        aperiodic                   SEQUENCE {
            aperiodicSRS-ResourceTrigger    INTEGER (1..maxNrofSRS-TriggerStates-1),
            csi-RS                  NZP-CSI-RS-ResourceId
            slotOffset              INTEGER (1..32)
            ...,
            [[
            aperiodicSRS-ResourceTriggerList-v1530    SEQUENCE (SIZE(1..maxNrofSRS-
TriggerStates-2))
                                    OF INTEGER (1..maxNrofSRS-TriggerStates-1)
            ]]
        },
        semi-persistent             SEQUENCE {
            associatedCSI-RS            NZP-CSI-RS-ResourceId
            ...
        },
        periodic                    SEQUENCE {
            associatedCSI-RS            NZP-CSI-RS-ResourceId
            ...
        }
    },
    usage           ENUMERATED {beamManagement, codebook, nonCodebook,
antennaSwitching},
    alpha                   Alpha
    p0                      INTEGER (-202..24)
    pathlossReferenceRS         CHOICE {
        ssb-Index               SSB-Index,
        csi-RS-Index            NZP-CSI-RS-ResourceId
    }
    srs-PowerControl AdjustmentStates       ENUMERATED {  sameAsFci2,
separateClosedLoop}
    ...
}
SRS-TPC-CommandConfig ::=   SEQUENCE {
    startingBitOfFormat2-3      INTEGER (1..31)
    fieldTypeFormat2-3          INTEGER (0..1)
    ...,
    [[
    startingBitOfFormat2-3SUL-v1530  INTEGER (1..31)
    ]]
}
```

Through the method described above, a terminal may determine or calculate SRS transmission power, and may transmit an SRS using the determined or calculated SRS transmission power. When a terminal performs PRACH transmission in an activated UL BWP b of a carrier f of a serving cell c, the terminal may determine PRACH transmission power $P_{PRACH,b,f,c}(i)(dBm)$ at a PRACH transmission occasion i based on Equation 6 below.

$$P_{PRACH,b,f,c}(i) = \min\{P_{CMAX,f,c}(i), P_{PRACH,target,f,c} + PL_{b,f,c}\} \quad \text{[Equation 6]}$$

In Equation 6, $P_{CMAX,f,c}(i)$ may represent the configured terminal transmit power. As an example, the configured UE transmit power may be interpreted as 'configured maximum UE output power' defined in 3GPP TS 38.101-1 and/or TS38.101-2. In addition, $P_{PRACH,target,f,c}$ indicates PRACH target reception power provided through higher layer signaling (e.g., RRC signaling, MAC-CE, etc.) for an activated UL BWP. In addition, $PL_{b,f,c}$ represent path loss for an activated UL BWP and may be determined based on a DL RS associated with PRACH transmission in an activated DL BWP of a serving cell c. For example, a terminal may determine path loss associated with PRACH transmission based on a synchronization signal (SS)/physical broadcast channel (PBCH) block associated with PRACH transmission.

Parameters and/or information for PRACH power control described above may be individually (i.e., independently) set for each BWP. In this case, the corresponding parameters and/or information may be configured or indicated through higher layer signaling (e.g., RRC signaling, MAC-CE, etc.). As an example, parameters and/or information for PRACH power control may be transmitted through RRC signaling, such as RACH-ConfigGeneric, and RACH-ConfigGeneric may be configured as shown in Table 9 below.

TABLE 9

```
RACH-ConfigGeneric ::=      SEQUENCE
    prach-ConfigurationIndex        INTEGER (0..255),
    msg1-FDM                        ENUMERATED {one, two, four, eight},
    msg1-Frequency Start            INTEGER (0..maxNrofPhysicalResourceBlocks-1),
    zeroCorrelationZoneConfig       INTEGER(0..15),
    preambleReceivedTargetPower     INTEGER (-202..-60),
    preambleTransMax                ENUMERATED {n3, n4, n5, n6, n7, n8, n10, n20, n50,
n100, n200},
    powerRampingStep                ENUMERATED {dB0, dB2, dB4, dB6},
    ra-Response Window              ENUMERATED {sl1, sl2, sl4, sl8, sl10, sl20, sl40, sl80},
    ...
}
```

Through the method described above, a terminal may determine or calculate PRACH transmit power, and may transmit a PRACH using the determined or calculated PRACH transmit power.

Multi Panel Operations

'A panel' referred to in the present disclosure may be interpreted/applied as 'a plurality of (or at least one) panels' or 'a panel group' (having a similarity/a common value from a viewpoint of a specific characteristic (e.g., timing advance (TA), a power control parameter, etc.)). Alternatively, 'a panel' referred to in the present disclosure may be interpreted/applied as 'a plurality of (or at least one) antenna ports' or 'a plurality of (or at least one) uplink resources' or 'an antenna port group' or 'an uplink resource group (or set)' (having a similarity/a common value from a viewpoint of a specific characteristic (e.g., TA, a power control parameter, etc.)). Alternatively, 'a panel' referred to in the present disclosure may be interpreted/applied as 'a plurality of (or at least one) beams' or 'at least one beam group (or set)' (having a similarity/a common value from a viewpoint of a specific characteristic (e.g., TA, a power control parameter, etc.)). Alternatively, 'a panel' referred to in the present disclosure may be defined as a unit for a terminal to configure a transmission/reception beam. For example, 'a transmission panel' may generate a plurality of candidate transmission beams in one panel, but it may be defined as a unit which may use only one beam of them in transmission at a specific time. In other words, only one transmission beam (spatial relation information RS) may be used per Tx panel to transmit a specific uplink signal/channel. In addition, 'a panel' in the present disclosure may refer to 'a plurality of (or at least one) antenna ports' or 'an antenna port group' or 'an uplink resource group (or set)' with common/similar uplink synchronization and may be interpreted/applied as an expression which is generalized as 'an uplink synchronization unit (USU)'. In addition, 'a panel' in the present disclosure may be interpreted/applied as an expression which is generalized as 'an uplink transmission entity (UTE)'.

In addition, the 'uplink resource (or resource group)' may be interpreted/applied as a PUSCH/PUCCH/SRS/PRACH resource (or resource group (or set)). In addition, the interpretation/application may be interpreted/applied conversely. In addition, 'an antenna (or an antenna port)' may represent a physical or logical antenna (or antenna port) in the present disclosure.

In other words, 'a panel' referred to in the present disclosure may be variously interpreted as 'a terminal antenna element group', 'a terminal antenna port group', 'a terminal logical antenna group', etc. In addition, for which physical/logical antennas or antenna ports will be combined and mapped to one panel, a variety of schemes may be considered by considering a position/a distance/a correlation between antennas, a RF configuration, and/or an antenna (port) virtualization scheme, etc. Such a mapping process may be changed according to terminal implementation. In addition, 'a panel' referred to in the present disclosure may be interpreted/applied as 'a plurality of panels' or 'a panel group' (having a similarity from a viewpoint of a specific characteristic).

Hereinafter, multi-panel structures will be described.

Terminal modeling which installs a plurality of panels (e.g., configured with one or a plurality of antennas) in terminal implementation in a high-frequency band (e.g., bi-directional two panels in 3GPP UE antenna modeling). A variety of forms may be considered in implementing a plurality of panels of such a terminal. Contents described below are described based on a terminal which supports a plurality of panels, but they may be extended and applied to a base station (e.g., a TRP) which supports a plurality of panels. The after-described contents related to multi-panel structures may be applied to transmission and reception of a signal and/or a channel considering multi panels described in the present disclosure.

Figure 7:
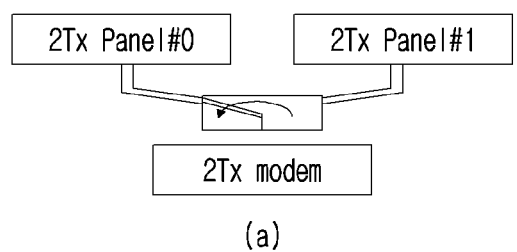
FIG. 7 is a diagram illustrating a multi-panel terminal in a wireless communication system to which the present disclosure may be applied.
Figure 7:
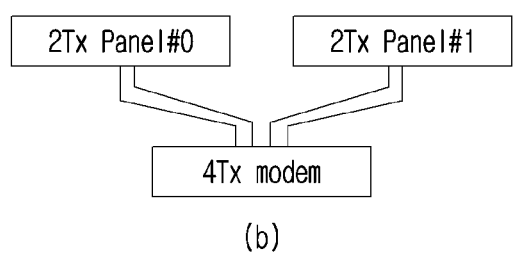

FIG. 7 is a diagram illustrating a multi-panel terminal in a wireless communication system to which the present disclosure may be applied.

FIG. 7(a) illustrates implementation of RF (radio frequency) switch-based multi panel terminals and FIG. 7(b) illustrates implementation of RF connection-based multi panel terminals.

For example, it may be implemented based on a RF switch as in FIG. 7(a). In this case, only one panel is activated for a moment and it may be impossible to transmit a signal for a certain duration of time to change an activated panel (i.e., panel switching).

For implementation of a plurality of panels in a different way, a RF chain may be connected respectively so that each panel can be activated anytime as in FIG. 7(b). In this case, time for panel switching may be 0 or too little. And, it may be possible to simultaneously transmit a signal by activating a plurality of panels at the same time (STxMP: simultaneous transmission across multi-panel) according to a model and power amplifier configuration.

For a terminal having a plurality of panels, a radio channel state may be different per panel, and in addition, a RF/antenna configuration may be different per panel, so a method in which a channel is estimated per panel is needed. In particular, a process in which one or a plurality of SRS resources are transmitted respectively per panel is needed to measure uplink quality or manage an uplink beam, or to measure downlink quality per panel or manage a downlink beam by utilizing channel reciprocity. Here, a plurality of SRS resources may be SRS resources which are transmitted by a different beam in one panel or may be SRS resources which are repeatedly transmitted by the same beam. Hereinafter, for convenience, a set of SRS resources transmitted in the same panel (a specific usage parameter (e.g., beam management, antenna switching, a codebook-based PUSCH, a non-codebook based PUSCH) and a specific time domain behavior (e.g., aperiodic, semi-persistent, or periodic)) may be referred to as an SRS resource group. For this SRS resource group, an SRS resource set configuration supported in a Rel-15 NR system may be utilized as it is or it may be configured separately by bundling one or a plurality of SRS resources (having the same time domain behavior and usage).

For reference, only when usage is beam management for the same usage and time domain behavior in Rel-15, a plurality of SRS resource sets may be configured. In addition, it is defined so that simultaneous transmission cannot be performed between SRS resources configured in the same SRS resource set, but simultaneous transmission can be performed between SRS resources belonging to a different SRS resource set. Accordingly, if panel implementation and simultaneous transmission of a plurality of panels as in FIG. 7(b) are considered, a corresponding concept (an SRS resource set) itself may be matched to an SRS resource group. But, an SRS resource group may be separately defined if even implementation (panel switching) as in FIG. 7(a) is considered. In an example, a configuration may be given by giving a specific ID to each SRS resource so that resources with the same ID belong to the same SRS resource group and resources with a different ID belong to a different resource group.

For example, it is assumed that 4 SRS resource sets configured for BM usage (RRC parameter usage is configured as 'BeamManagement') are configured to a UE. Hereinafter, for convenience, each is referred to as SRS resource set A, B, C, D. In addition, a situation is considered which applies implementation performing SRS transmission by corresponding each of the sets to one (Tx) panel because UE implements a total of 4 (Tx) Panels.

TABLE 10

| The maximum number of SRS resource sets across all time domain behaviors (periodic/semi-persistent/aperiodic) reported in 2-30 | Additional limit to the maximum number of the maximum SRS resource sets per supported time domain behavior (periodic/semi-persistent/aperiodic) |
| --- | --- |
| 1 | 1 |
| 2 | 1 |
| 3 | 1 |
| 4 | 2 |
| 5 | 2 |
| 6 | 2 |
| 7 | 4 |
| 8 | 4 |

In Rel-15 standards, such UE implementation is more clearly supported by the following agreement. In other words, for a UE which performs capability reporting for a value reported in feature group (FG) 2-30 as 7 or 8 in Table 10, a total of up to 4 SRS resource sets for BM (per supported time domain behavior) may be configured as in the right column of Table 10. As above, implementation which performs transmission by corresponding one UE panel to each set may be applied.

Here, when 4 panel UE corresponds each panel to one SRS resource set for BM and transmits it, the number itself of configurable SRS resources per each set is also supported by separate UE capability signaling. For example, it is assumed that 2 SRS resources are configured in the each set. It may correspond to 'the number of UL beams' which may be transmitted per panel. In other words, the UE may respectively correspond 2 UL beams to 2 configured SRS resources per each panel and transmit them when 4 panels are implemented. In this situation, according to Rel-15 standards, one of a codebook (CB)-based UL or non-codebook (NCB)-based UL mode may be configured for final UL PUSCH transmission scheduling. In any case, only one SRS resource set (having usage set as "CB-based UL" or "NCB-based UL") configuration, i.e., only one dedicated SRS resource set (for a PUSCH) configuration, is supported in Rel-15 standards.

Hereinafter, multi panel UE (MPUE) categories will be described.

Regarding the above-described multi panel operations, the following 3 MPUE categories may be considered. Specifically, 3 MPUE categories may be classified according to i) whether multiple panels may be activated and/or ii) transmission using multiple panels may be possible.

i) MPUE category 1: In a terminal that multiple panels are implemented, only one panel may be activated at a time. A delay for panel switching/activation may be configured as [X]ms. In an example, the delay may be configured to be longer than a delay for beam switching/activation and may be configured in a unit of a symbol or in a unit of a slot. MPUE category 1 may correspond to MPUE-assumption) described in standardization-related documents (e.g., a 3gpp agreement, a technical report (TR) document and/or a technical specification (TS) document, etc.).

ii) MPUE category 2: In a terminal that multiple panels are implemented, multiple panels may be activated at a time. One or more panels may be used for transmission. In other words, simultaneous transmission using panels may be performed in a corresponding category. MPUE category 2 may correspond to MPUE-assumption2 described in standardization-related documents (e.g., a 3gpp agreement, a TR document and/or a TS document, etc.).

iii) MPUE category 3: In a terminal that multiple panels are implemented, multiple panels may be activated at a time, but only one panel may be used for transmission. MPUE category 3 may correspond to MPUE-assumption3 described in standardization-related documents (e.g., a 3gpp agreement, a TR document and/or a TS document, etc.).

Regarding multi panel-based signal and/or channel transmission and reception suggested in the present disclosure, at least one of the above-described 3 MPUE categories may be supported. In an example, in Rel-16, MPUE category 3 of the following 3 MPUE categories may be (selectively) supported.

In addition, information on a MPUE category may be predefined in specifications (i.e., standards). Alternatively, information on a MPUE category may be configured semi-statically and/or may be indicated dynamically according to a system situation (i.e., a network aspect, a terminal aspect). In this case, a configuration/an indication, etc. related to multi panel-based signal and/or channel transmission and reception may be configured/indicated by considering a MPUE category.

Hereinafter, a configuration/an indication related to panel-specific transmission/reception will be described.

Regarding a multi panel-based operation, signal and/or channel transmission and reception may be performed in a panel-specific way. Here, being panel-specific may mean that signal and/or channel transmission and reception in a unit of a panel may be performed. Panel-specific transmission and reception may be referred to as panel-selective transmission and reception.

Regarding panel-specific transmission and reception in a multi panel-based operation suggested in the present disclosure, a method of using identification information (e.g., an identifier (ID), an indicator, etc.) for configuring and/or indicating a panel which will be used for transmission and reception among one or more panels may be considered.

In an example, an ID for a panel may be used for panel-selective transmission of a PUSCH, a PUCCH, an SRS, and/or a PRACH among activated multiple panels. The ID may be configured/defined based on at least any one of the following 4 methods (options (Alts) 1, 2, 3, 4).

i) Alt. 1: An ID for a panel may be an SRS resource set ID.

In an example, it may be desirable to correspond each UE Tx panel to an SRS resource set configured in terms of terminal implementation when considering a) an aspect that SRS resources of multiple SRS resource sets having the same time domain behavior are simultaneously transmitted in the same BWP, b) an aspect that a power control parameter is configured in a unit of an SRS resource set, c) an aspect that a terminal may report up to 4 SRS resource sets (they may correspond to up to 4 panels) according to a supported time domain behavior. In addition, an Alt. 1 scheme has an advantage that an SRS resource set related to each panel may be used for 'codebook' and 'non-codebook'-based PUSCH transmission. In addition, for an Alt. 1 scheme, multiple SRS resources belonging to multiple SRS resource sets may be selected by extending an SRI (SRS resource indicator) field of DCI. In addition, a mapping table of an SRI to SRS resource may need to be extended to include SRS resources in the whole SRS resource set.

ii) Alt. 2: An ID for a panel may be an ID which is (directly) associated with a reference RS resource and/or a reference RS resource set.

ii) Alt. 3: An ID for a panel may be an ID which is directly associated with a target RS resource (a reference RS resource) and/or a reference RS resource set.

An Alt. 3 scheme has an advantage that configured SRS resource set(s) corresponding to one UE Tx panel may be controlled more easily and that the same panel identifier may be allocated to multiple SRS resource sets having a different time domain behavior.

iv) Alt. 4: An ID for a panel may be an ID which is additionally configured to spatial relation information (e.g., RRC SpatialRelationInfo).

An Alt. 4 scheme may be a scheme which newly adds information for representing an ID for a panel. In this case, it has an advantage that configured SRS resource sets corresponding to one UE Tx panel may be controlled more easily and that the same panel identifier may be allocated to multiple SRS resource sets having a different time domain behavior.

In an example, a method of introducing an UL TCI similarly to the existing DL TCI (Transmission Configuration Indication) may be considered. Specifically, definition of a UL TCI state may include a list of reference RS resources (e.g., an SRS, a CSI-RS and/or an SSB). A current SRI field may be reused to select a UL TCI state from a configured set or a new DCI field of DCI format 0_1 (e.g., a UL-TCI field) may be defined for a corresponding purpose.

Information related to the above-described panel-specific transmission and reception (e.g., a panel ID, etc.) may be transmitted by higher layer signaling (e.g., a RRC message, MAC-CE, etc.) and/or lower layer signaling (e.g., layer1 (L1: Layer1) signaling, DCI, etc.). Corresponding information may be transmitted from a base station to a terminal or may be transmitted from a terminal to a base station according to a situation or if necessary.

In addition, corresponding information may be configured by a hierarchical method which configures a set for a candidate group and indicates specific information.

In addition, the above-described identification information related to a panel may be configured in a unit of a single panel or in a unit of multiple panels (e.g., a panel group, a panel set).

Operation Related to Multi-TRPs

A coordinated multi point (CoMP) scheme refers to a scheme in which a plurality of base stations effectively control interference by exchanging (e.g., using an X2 interface) or utilizing channel information (e.g., RI/CQI/PMI/LI (layer indicator), etc.) fed back by a terminal and cooperatively transmitting to a terminal. According to a scheme used, a CoMP may be classified into joint transmission (JT), coordinated Scheduling (CS), coordinated Beamforming (CB), dynamic Point Selection (DPS), dynamic Point Blocking (DPB), etc.

M-TRP transmission schemes that M TRPs transmit data to one terminal may be largely classified into i) eMBB M-TRP transmission, a scheme for improving a transfer rate, and ii) URLLC M-TRP transmission, a scheme for increasing a reception success rate and reducing latency.

In addition, with regard to DCI transmission, M-TRP transmission schemes may be classified into i) M-TRP transmission based on M-DCI (multiple DCI) that each TRP transmits different DCIs and ii) M-TRP transmission based on S-DCI (single DCI) that one TRP transmits DCI. For example, for S-DCI based M-TRP transmission, all scheduling information on data transmitted by M TRPs should be delivered to a terminal through one DCI, it may be used in an environment of an ideal BackHaul (ideal BH) where dynamic cooperation between two TRPs is possible.

A UE may recognize PUSCH (or PUCCH) scheduled by DCI received in different control resource sets (CORESETs) (or CORESETs belonging to different CORESET groups) as PUSCH (or PUCCH) transmitted to different TRPs or may recognize PDSCH (or PDCCH) from different TRPs. In addition, the below-described method for UL transmission (e.g., PUSCH/PUCCH) transmitted to different TRPs may be applied equivalently to UL transmission (e.g., PUSCH/PUCCH)transmitted to different panels belonging to the same TRP.

Hereinafter, a CORESET group ID described/mentioned in the present disclosure may mean an index/identification information (e.g., an ID, etc.) for distinguishing a CORESET for each TRP/panel. In addition, a CORESET group may be a group/union of CORESET distinguished by an index/identification information (e.g., an ID)/the CORESET group ID, etc. for distinguishing a CORESET for each TRP/panel. In an example, a CORESET group ID may be specific index information defined in a CORESET configuration. In this case, a CORESET group may be configured/indicated/defined by an index defined in a CORESET configuration for each CORESET. Additionally/alternatively, a CORESET group ID may mean an index/identification information/an indicator, etc. for distinguishment/identification between CORESETs configured/associated with each TRP/panel. Hereinafter, a CORESET group ID described/mentioned in the present disclosure may be expressed by being substituted with a specific index/specific identification information/a specific indicator for distinguishment/identification between CORESETs configured/associated with each TRP/panel. The CORESET group ID, i.e., a specific index/specific identification information/a specific indicator for distinguishment/identification between CORESETs configured/associated with each TRP/panel may be configured/indicated to a terminal through higher layer signaling (e.g., RRC signaling)/L2 signaling (e.g., MAC-CE)/L1 signaling (e.g., DCI), etc. In an example, it may be configured/indicated so that PDCCH detection will be performed per each TRP/panel in a unit of a corresponding CORESET group (i.e., per TRP/panel belonging to the same CORESET group). Additionally/alternatively, it may be configured/indicated so that uplink control information (e.g., CSI, HARQ-A/N (ACK/NACK), SR (scheduling request)) and/or uplink physical channel resources (e.g., PUCCH/PRACH/SRS resources) are separated and managed/controlled per each TRP/panel in a unit of a corresponding CORESET group (i.e., per TRP/panel belonging to the same CORESET group). Additionally/alternatively, HARQ A/N (process/retransmission) for PDSCH/PUSCH, etc. scheduled per each TRP/panel may be managed per corresponding CORESET group (i.e., per TRP/panel belonging to the same CORESET group).

For example, ControlResourceSet information element (IE), which is a higher layer parameter, is used to configure a time/frequency control resource set (CORESET). For example, the control resource set (CORESET) may be related to detection and reception of downlink control information. The ControlResourceSet IE may include a CORESET related ID (e.g., controlResourceSetID)/an index of a CORESET pool for a CORESET (e.g., CORESETPoolIndex)/a time/frequency resource configuration of a CORESET/TCI information related to a CORESET, etc. For example, an index of a CORESET pool (e.g., CORESETPoolIndex) may be configured to 0 or 1. In the above description, a CORESET group may correspond to a CORESET pool, and a CORESET group ID may correspond to a CORESET pool index (e.g., CORESETPoolIndex).

Hereinafter, a method for improving reliability in Multi-TRP will be described.

As a transmission and reception method for improving reliability using transmission in a plurality of TRPs, the following two methods may be considered.

Figure 8:
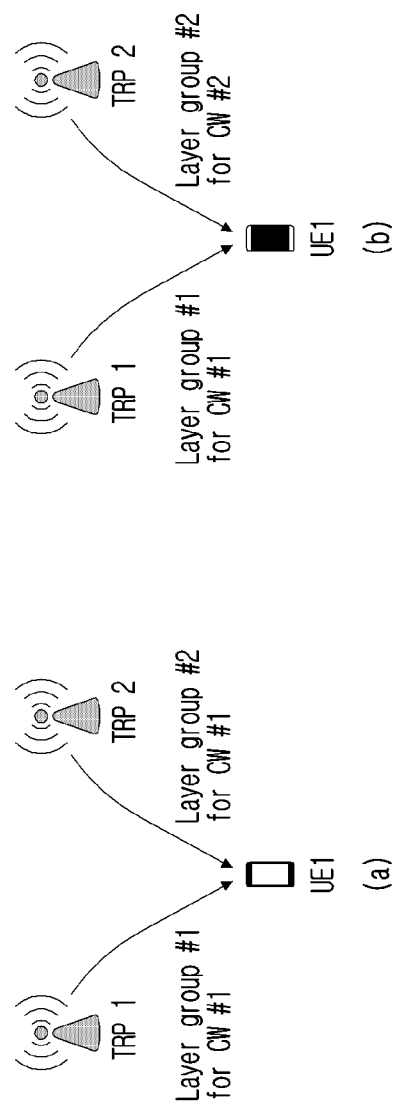
FIG. 8 illustrates a method of multiple TRPs transmission in a wireless communication system to which the present disclosure may be applied.

FIG. 8 illustrates a method of multiple TRPs transmission in a wireless communication system to which the present disclosure may be applied.

In reference to FIG. 8(a), it is shown a case in which layer groups transmitting the same codeword (CW)/transport block (TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 8(b), an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 8(b), it may have a disadvantage that a code rate corresponding to a TB is higher compared to FIG. 8(a). However, it has an advantage that it may adjust a code rate by indicating a different RV (redundancy version) value or may adjust a modulation order of each CW for encoded bits generated from the same TB according to a channel environment.

According to methods illustrated in FIG. 8(a) and FIG. 8(b) above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method based on a different frequency domain resource (e.g., RB/PRB (set), etc.) and/or a TDM (time division multiplexing) method based on a different time domain resource (e.g., a slot, a symbol, a sub-symbol, etc.).

The Multi-TRP, scheduled by at least one DCI, may be performed as follows:
  i) Method 1 (SDM): n (n is a natural number) TCI states in a single slot in overlapping time and frequency resource allocation
    Method 1a: Each transmission occasion is one layer or a set of layers of the same TB, and each layer or each set of layers is associated with one TCI and one set of DMRS port(s). A single codeword with one redundancy version (RV) is used for all layers or sets of layers. From a UE point of view, different coded bits are mapped to different layers or sets of layers with specific mapping rules.
    Method 1b: Each transmission occasion is one layer or a set of layers of the same TB, and each layer or each set of layers is associated with one TCI and one set of DMRS port(s). A single codeword with one RV is used for each spatial layer or a set of layers. RVs corresponding to each spatial layer or each set of layers may be the same or different.
    Method 1c: Each transmission occasion is one layer of the same TB with one DMRS port associated with multiple TCI state indexes, or one layer of the same TB with multiple DMRS ports associated with multiple TCI indexes one by one.
  In methods 1a and 1c described above, the same MCS is applied to all layers or sets of layers.
  ii) Method 2 (FDM): n (n is a natural number) TCI states in a single slot in non-overlapping frequency resource allocation. Each non-overlapping frequency resource allocation is associated with one TCI state. The same single/multiple DMRS port(s) are associated with all non-overlapping frequency resource allocations.
    Method 2a: A single codeword with one RV is used across an entire resource allocation. From a UE point of view, a common RB mapping (layer mapping of codewords) is applied across all resource allocations.

Method 2b: A single codeword with one RV is used for each non-overlapping frequency resource allocation. RVs corresponding to each non-overlapping frequency resource allocation may be the same or different.

For method 2a, the same MCS is applied to all non-overlapping frequency resource allocations.

iii) Method 3 (TDM): n (n is a natural number) TCI states in a single slot in non-overlapping time resource allocation. Each transmission occasion of a TB has one TCI and one RV in a time granularity of a mini-slot. All transmission occasion(s) within a slot use a common MCS with the same single or multiple DMRS port(s). An RV/TCI state may be the same or different among transmission occasions.

iv) Method 4 (TDM): n (n is a natural number) TCI states in K (n<=K, where K is a natural number) different slots. Each transmission occasion of a TB has one TCI and one RV. All transmission occasion(s) across K slots use a common MCS with the same single or multiple DMRS port(s). An RV/TCI state may be the same or different among transmission occasions.

Method for Transmitting and Receiving an Uplink Signal

Hereinafter, in the methods proposed in the present disclosure, UL MTRP-URLLC means that multiple TRPs receive the same data/uplink control information (UCI) from one UE using different layer/time/frequency resources. For example, TRP 1 receives the same data/DCI from a UE in resource 1, TRP 2 receives the same data/DCI from the UE in resource 2, and then the received data/DCI is shared through a backhaul link connected between TRPs. A UE configured for the UL MTRP-URLLC transmission method transmits the same data/UCI using different layer/time/frequency resources. Here, a UE is indicated by a base station which Tx beam and which Tx power (i.e., UL TCI state) to use in layer/time/frequency resources in which the same data/UCI is transmitted. For example, when the same data/UCI is transmitted in resource 1 and resource 2, a UL TCI state used in resource 1 and a UL TCI state used in resource 2 are indicated. Such UL MTRP URLLC may be applied to a PUSCH/PUCCH.

In addition, in the methods proposed in the present disclosure, using (/mapping) a specific TCI state (or TCI) when receiving data/DCI/UCI for a certain frequency/time/space resource may mean, in the case of DL, that a channel from a DMRS using a QCL type and a QCL reference signal (RS) indicated by a corresponding TCI state in the frequency/time/spatial resource is estimated and data/DCI are received/demodulated using the estimated channel. In the case of UL, it may mean that a DMRS and data/UCI are transmitted/modulated using a Tx beam and/or Tx power indicated by the corresponding TCI state in the frequency/time/spatial resource.

The UL TCI state includes Tx beam or Tx power information of a UE, and may be configured to a UE through other parameters such as spatial relation info, etc. instead of the TCI state. The UL TCI state may be directly indicated in UL grant DCI, or may mean spatial relation info of an SRS resource indicated through an SRS resource indicator (SRI) field of UL grant DCI. Alternatively, it may mean an open loop (OL) transmission power control parameter (Tx power control parameter) (j: an index for OL (open loop) parameters $P_O$ and alpha (up to 32 parameter value sets per cell), q_d: an index of a DL RS resource for pathloss (PL) measurement (up to 4 measurements per cell), l: a closed loop (CL) power control process index (up to 2 processes per cell)) associated with a value indicated through an SRI field of UL grant DCI.

On the other hand, MTRP-eMBB means that multiple TRPs transmit different data using different layers/times/frequency, and a UE configured with the MTRP-eMBB transmission method assumes that various TCI states are indicated by DCI and data received using a QCL RS of each TCI state are different data.

In the present disclosure, for convenience of description, the proposed method is applied assuming cooperative transmission/reception between two TRPs, but it can be extended and applied in a multiple TRP environment of 3 or more, and can also be extended and applied in a multi-panel environment. Different TRPs can be perceived as different TCI states by a UE, so when a UE receives/transmits data/DCI/UCI using TCI state 1, it means that it receives/transmits data/DCI/UCI from/to TRP 1.

In addition, in the present disclosure, when a UE repeatedly transmits the same PUSCH so that a plurality of base stations (i.e., MTRP) receive it, it may mean that the same data is transmitted through a plurality of PUSCHs. Here, each PUSCH may be transmitted in an optimized manner for UL channels of different TRPs. Also, in the present disclosure below, when a UE divides and transmits the same PUSCH so that a plurality of base stations (ie, MTRP) receive it, it may mean that one data is transmitted through one PUSCH, but resources allocated to the PUSCH are divided and transmitted in an optimized manner for UL channels of different TRPs.

Similar to PUSCH transmission, a UE may repeatedly transmit the same PUCCH or divide and transmit the same PUCCH so that a plurality of base stations (i.e., MTRP) may receive the PUCCH.

For a plurality of transmission occasions (TOs) indicated to a UE to repeatedly transmit or dividedly transmit a PDCCH/PDSCH/PUSCH/PUCCH, UL transmission toward a specific TRP or DL reception from a specific TRP is performed at each TO. Here, a UL TO (or TO of TRP 1) transmitted toward TRP 1 means a TO using the first value among two spatial relations, two UL TCIs, two UL power control parameter sets, or two pathloss reference signals (PLRS) indicated to a UE. In addition, a UL TO (or TO of TRP 2) transmitted toward TRP 2 means a TO using the second value among two spatial relations, two UL TCIs, two UL power control parameter sets, or two pathloss reference signals (PLRS) indicated to a UE. Similar to this, even during DL transmission, a DL TO transmitted by TRP 1 (or TO of TRP 1) means a TO using the first value among two DL TCI states indicated to a UE (e.g., when two TCI states are configured in a CORESET). In addition, a DL TO transmitted by TRP 2 (or TO of TRP 2) means a TO using the second value among two DL TCI states indicated to a UE (e.g., when two TCI states are configured in a CORESET).

The proposal of the present disclosure may be extended and applied to various channels such as PUSCH/PUCCH/PDSCH/PDCCH.

The proposal of the present disclosure can be extended and applied to both a case of repeatedly transmitting the channel and a case of dividing and transmitting the channel, in different time/frequency/spatial resources.

Hereinafter, SRS resource indicator (SRI)-based PUSCH beam indication and PUSCH power control are described.

In Rel-15 NR, according to how many SRS resources are configured in a SRS resource set for codebook (CB)/non-codebook (NCB) (i.e., according to the number of SRS resources), it may exist in a SRI field in DCI format 0_1 or not. Specifically, when only 1 SRS resource is configured in a SRS resource set for CB, a SRI field in DCI does not exist and a terminal implicitly utilizes a corresponding SRS as a transmission beam reference when transmitting a PUSCH. When scheduling a PUSCH by DCI format 0_1, a base station indicates a PUSCH beam as a transmission beam when recently transmitting corresponding SRS resource(s) by indicating specific SRS resource(s) for CB/NCB through a SRI field. When a base station schedules a PUSCH by DCI format 0_0, a terminal utilizes a transmission beam of a PUCCH resource of a lowest identifier (ID) among PUCCH resources that PUCCH spatial relation information (PUCCH-spatialRelationInfo) is activated as a PUSCH beam.

PUSCH power control of Rel-15 NR is performed as follows.

A pathloss reference RS, power configured by a base station (P0), an alpha which is a power control related coefficient configured by a base station (i.e., a coefficient for pathloss compensation) and a closed-loop index are grouped into a set per identifier (ID) for SRI-based PUSCH power control (i.e., sri-PUSCH-PowerControlId) within a higher layer information element (IE) for SRI-based PUSCH power control (i.e., a SRI-PUSCH-PowerControl IE) and corresponding IDs (i.e., a power control parameter set) are mapped to a codepoint of each SRI field.

In a SRI indication, PUSCH power is determined by a PUSCH power control parameter set connected/mapped/associated with a codepoint indicated by a SRI field.

When there is no SRI field, PUSCH power is determined in the same way as PUSCH power control scheduled by the following DCI format 0_0.

Hereinafter, power control of a PUSCH scheduled by DCI format 0_0 and a PUSCH of configured grant (CG) is described.

When a terminal performs PUSCH transmission in an activated UL BWP (b) of a carrier (f) of a serving cell (c) by using a parameter set configuration based on index j and a PUSCH power control adjustment state based on index 1, a terminal may determine PUSCH transmission power $P_{PUSCH,b,f,c}(i,j,q_d,l)$(dBm) at a PUSCH transmission occasion (i) based on the following Equation 7.

[Equation 7]

$$P_{PUSCHb,f,c}(i, j, q_d, l) = \min\begin{Bmatrix} P_{CMAXf,c}(i), \\ P_{O\_PUSCHb,f,c}(j) + 10\log_{10}\left(2^{\mu} \cdot M_{RBb,f,c}^{PUSCH}(i)\right) + \\ \alpha_{b,f,c}(j) \cdot PL_{b,f,c}(q_d) + \Delta_{TF,b,f,c}(i) + f_{b,f,c}(i, l) \end{Bmatrix}$$

In reference to Equation 7, power control parameters are described.

A open-loop power control parameter is described.

i) A PUSCH scheduled by DCI format 0_0

Index j: A value of index j for a parameter set configuration is 2.

Nominal power (P0_nominal): When a higher layer parameter (i.e., p0-NominalWithGrant) for nominal power for a PUSCH with grant is provided, nominal power (P0_nominal) configured by a base station is configured by a corresponding higher layer parameter. When the parameter is not provided, P0_nominal(2) is P0_nominal(0) (i.e., nominal power for index j=0 (P0_nominal) is applied equally).

P0_UE (i.e., power configured by a base station (P0)): It is configured as a parameter for a P0 and alpha set for a first PUSCH (i.e., P0-PUSCH-AlphaSet) in a parameter (i.e., p0-AlphaSets) for configuring a {p0-pusch, alpha} set for a PUSCH (i.e., P0 in a first set). If, for example, like an Rel-16 URLLC-related operation, when P0 may be dynamically indicated in DCI, it may be differently configured according to a codepoint.

Alpha (i.e., a power control-related coefficient configured by a base station): It is configured as a parameter for a P0 and alpha set for a first PUSCH (i.e., P0-PUSCH-AlphaSet) in a parameter (i.e., p0-AlphaSets) for configuring a {p0-pusch, alpha} set for a PUSCH (i.e., an alpha in a first set).

Pathloss reference RS: It is configured as a parameter (PUCCH-SpatialRelationInfo) for PUCCH spatial relation information for a PUCCH resource having a lowest index (i.e., a pathloss reference RS in PUCCH spatial relation information) or a pathloss reference RS corresponding to PUSCH pathloss reference RS ID parameter (i.e., PUSCH-PathlossReferenceRS-Id) 0 (when there is no spatial configuration for a PUCCH).

ii) A configured grant (CG) PUSCH

Index j: A value of index j for a parameter set configuration is 1.

Nominal power (P0_nominal): When a higher layer parameter (i.e., p0-NominalWithoutGrant) for nominal power for a PUSCH without grant is provided, nominal power (P0_nominal) configured by a base station is configured by a corresponding higher layer parameter. When the parameter is not provided, P0_nominal(1) is P0_nominal(0) (i.e., nominal power for index j=0 (P0_nominal) is applied equally).

P0_UE (i.e., power configured by a base station (P0)): It is configured as P0 for a P0 and alpha parameter for a PUSCH (i.e., p0-PUSCH-Alpha) in a higher layer parameter (ConfiguredGrantConfig) for configuring configured grant (this parameter represents an index (i.e., P0-PUSCH-AlphaSetId) of a P0 and alpha set for a PUSCH (i.e., P0-PUSCH-AlphaSet) (i.e., P0 for a P0 and alpha parameter for a PUSCH).

Alpha (i.e., a power control-related coefficient configured by a base station): It is configured as P0 for a PUSCH and an alpha parameter (i.e., p0-PUSCH-Alpha) in a higher layer parameter (ConfiguredGrantConfig) for a configuration of configured grant (this parameter represents P0 for a PUSCH and an index (i.e., P0-PUSCH-AlphaSetId) of an alpha set (i.e., P0-PUSCH-AlphaSet) (i.e., P0 for a PUSCH and P0 in an alpha parameter).

Pathloss reference RS: When a parameter for configured uplink grant of a RRC layer (i.e., rrc-ConfiguredUplinkGrant) is provided, it is configured as a pathloss reference index included in a corresponding parameter (i.e., pathlossReferenceIndex). If the parameter is not provided, when a SRI field exists, it is configured as a pathloss (PL) RS of a codepoint indicated by a SRI field of activating DCI. If the parameter is not provided, when a SRI field does not exist, it is configured as a pathloss reference RS corresponding to PUSCH pathloss reference RS identifier (i.e., PUSCH-PathlossReferenceRS-Id) 0.

A closed-loop power control parameter (index l∈{0,1}) is described.

i) A PUSCH scheduled by DCI format 0_0
   Index 1: 1 is 0.
      Index 1: It is configured by a higher layer parameter (i.e., powerControlLoopToUse) for closed-loop power control which will be used.

In addition, in Rel-16 eMIMO (enhanced MIMO), in multi-TRP PDSCH transmission, standardization was performed for single DCI based PDSCH transmission and multi DCI based PDSCH transmission. In Rel-17 FeMIMO (further enhanced MIMO), standardization for multi-TRP transmission (e.g., a PDCCH, a PUCCH, a PUSCH, etc.) excluding a PDSCH will be performed (hereinafter, multi-TRP is abbreviated to M-TRP, MTRP, etc.). For M-TRP UL transmission (a PUCCH, a PUSCH), a transmission occasion (TO) group corresponding to each TRP may be configured/defined and a configuration for a method of transmitting each TO may be performed by a base station before configuring/indicating/scheduling/triggering each (PUCCH/PUSCH) TO transmission. For example, for M-TRP PUSCH transmission, single DCI based scheduling and multi DCI based scheduling are possible, and before such scheduling (or through a scheduling indication), timing advance (TA), a rank, PUSCH DMRS port(s), a transmit precoding matrix indicator (TPMI), a modulation coding and scheme (MCS), a (OL/CL) power control parameter set, a Tx beam (a spatial relation), a spatial panel (a Tx panel), etc. for 2 or more multiple TOs may be configured/indicated.

Table 11 illustrates a FeMIMO work item related to M-TRP improvement.

PUSCH scheduled by DCI format 0_0/0_1). The power control operation includes an operation that a base station configures/indicates a open-loop power control parameter and configures/indicates closed-loop power control information to a terminal. Such an operation basically targets a single-TRP (S-TRP). Accordingly, when multi-TRP (M-TRP) UL PUSCH transmission is performed, a base station needs an operation of separately configuring/providing/indicating to a terminal open-loop/closed-loop power control information for a PUSCH towards a different TRP in a PUSCH power control operation.

Based on such a background, herein, in a M-TRP scenario, a power control method for a PUSCH scheduled by a base station to a terminal (e.g., a CG PUSCH, a PUSCH scheduled by DCI format 0_0) is proposed and a method of transmitting a PUSCH of a subsequent terminal is proposed.

In the present disclosure, '/' may be interpreted as 'and', 'or' or 'and/or' according to a context.

Hereinafter, it is mainly described by considering M-TRP PUSCH time division multiplexing (TDM) repeat transmission of a single-panel terminal, but it is for convenience of a description, and it does not exclude other scenarios (e.g., TDM transmission of a multi-panel terminal and frequency division multiplexing (FDM) and spatial division multiplexing (SDM) transmission of a terminal) and may be included in an embodiment of the present disclosure.

Proposal 1: A base station may configure/indicate each power control related parameter for a PUSCH towards different target TRP i (and/or TO group i)(i is a natural number) to a terminal in order to schedule M-TRP PUSCH transmission of a terminal. The power control related parameter may include at least one of an open-loop power control parameter (i.e., power configured by a base station (P0), a power control related coefficient configured by a base station (alpha), a pathloss reference RS) and a closed-loop power control parameter (i.e., a closed-loop index). In other words, a power control parameter set (including at least one of power configured by a base station (P0), a power control related coefficient configured by a base station (alpha), a pathloss reference RS and/or a closed-loop index) may be individually configured per TRP i (and/or TO group i) (i is a natural number).

The target TRP i (and/or TO group i) and target TRP i+1 (and/or TO group i+1) may correspond to i) spatial relation

TABLE 11

Improvement for supporting multi-TRP deployment by targeting both FR1 and FR2:
  a. Based on Rel-16 reliability features, features for improving reliability and robustness for a channel other than a PDSCH (i.e., a PDCCH, a PUSCH, and a PUCCH) are identified
and specified by using multi-TRPs and/or multi-panels.
  b. QCL/TCI-related improvement for allowing an inter-cell multi-TRP operation is identified and specified by assuming multi-DCI based multi-PDSCH reception.
  c. Beam management-related improvement is evaluated and if necessary, specified for multi-TRP transmission simultaneously with multi-panel reception.
  d. Improvement for supporting a high speed train-single frequency network (HST-SFN):
    i) Solutions for a QCL assumption for a DMRS (e.g., in targeting DL-only transmission, multiple QCL assumptions for the same DMRS port(s)) are identified and specified.
    ii) A QCL/a relation like a QCL between a DL and UL signal is evaluate by reusing an
integrated TCI framework (including applicable type(s) and associated requirements) and an advantage over a Rel. 16 HST improvement baseline, if proved, is specified.

As described above, in NR Rel-15 and Rel-16, an operation that a base station performs power control is defined to determine transmit power in PUSCH transmission of a terminal (including a configured-grant (CG) PUSCH, a information (spatialRelationInfo) i and spatial relation information (spatialRelationInfo) i+1 or correspond to ii) SRS resource set associated CSI-RS resource (associatedCSI-RS) i and SRS resource set associated CSI-RS resource (associatedCSI-RS) i+1 for PUSCH transmission configured by a base station to a terminal (e.g., i may be 0).

Transmit power of a PUSCH may be determined according to the Equation 7 based on a power control parameter configuration described later.

Embodiment 1) a Method of Configuring a Power Control Parameter for a Configured Grant (CG) PUSCH (in PUSCH Scheduling for i TRPs (and/or TO Groups)

i) Open-loop power control
  Index j: j is 1. Alternatively, different index j may be configured per each TRP (and/or TO group).
  Nominal power (P0_nominal): For nominal power configured by a base station (P0_nominal), when a higher layer parameter for nominal power for a PUSCH without grant (i.e., p0-NominalWithoutGrant)) is provided by a base station, i nominal power (P0_nominal) may be configured by the parameter per each TRP (and/or TO group). When the parameter (i.e., p0-NominalWithoutGrant) is not provided, P0_nominal(1)=P0_nominal(0) may be commonly configured for all TRPs (and/or TO groups) (i.e., nominal power for index j=0 (P0_nominal) is applied equally).

Alternatively, when a M-TRP PUSCH is scheduled, it may be guaranteed that a base station will provide to a terminal a higher layer parameter for nominal power for a PUSCH without grant (i.e., p0-NominalWithoutGrant). And, a terminal may use a higher layer parameter for nominal power for a PUSCH without grant (i.e., p0-NominalWithoutGrant) for any one TRP (and/or TO group) (i.e., nominal power configured by a corresponding parameter (P0_nominal) is applied). And, a terminal may use P0_nominal(0) for another TRP (and/or TO group). For example, P0_nominal(0) may be used for a primary/default TRP (and/or TO group).

P0_UE (i.e., power configured by a base station (P0)): A base station may configure for a terminal values of a P0 and alpha parameter for a PUSCH (i.e., p0-PUSCH-Alpha) for i TRPs (and/or TO groups) in a higher layer parameter for a configured grant configuration (ConfiguredGrantConfig) (this parameter represents an index (i.e., P0-PUSCH-AlphaSetId) of a P0 and alpha set for a PUSCH (i.e., P0-PUSCH-AlphaSet)). For example, values of a P0 and alpha parameter for a PUSCH (i.e., p0-PUSCHAlpha) for i TRPs (and/or TO groups) may be configured in a form of paired order. In other words, P0 corresponding to each of the configured indexes may be configured for the terminal in a P0 and alpha set for a PUSCH (i.e., P0-PUSCH-AlphaSet).
  Alpha (i.e., power control related coefficient configured by a base station): A base station may configure for a terminal values of a P0 and alpha parameter for a PUSCH (i.e., p0-PUSCH-Alpha) for i TRPs (and/or TO groups) in a higher layer parameter for a configured grant configuration (ConfiguredGrantConfig) (this parameter represents an index (i.e., P0-PUSCH-AlphaSetId) of a P0 and alpha set for a PUSCH (i.e., P0-PUSCH-AlphaSet)). For example, values of a P0 and alpha parameter for a PUSCH (i.e., p0-PUSCHAlpha) for i TRPs (and/or TO groups) may be configured in a form of paired order. In other words, an alpha corresponding to each of the configured indexes may be configured for the terminal in a P0 and alpha set for a PUSCH (i.e., P0-PUSCH-AlphaSet).

Pathloss reference RS: When a parameter for configured uplink grant of a RRC layer (i.e., rrc-ConfiguredUplinkGrant) is provided by a base station, it is configured as a pathloss reference index for i TRPs (and/or TO groups) in a corresponding parameter (i.e., pathlossReferenceIndex). And, pathloss reference RS(s) corresponding to a pathloss reference index for i TRPs (and/or TO groups) (i.e., pathlossReferenceIndex) may be used for a PUSCH for i TRPs (and/or TO groups) (in a form of paired order).
  If a parameter for configured uplink grant of a RRC layer (i.e., rrc-ConfiguredUplinkGrant) is not provided by a base station, pathloss reference RS(s) may be used for a PUSCH for i TRPs (and/or TO groups) connected/associated/indicated for a codepoint indicated by a SRI field of activating DCI when there is a SRI field in DCI (i.e., DCI activating a CG PUSCH). Alternatively, if there is no SRI field in the DCI (i.e., DCI activating a CG PUSCH), pathloss reference RS(s) corresponding to an identifier (ID) from PUSCH pathloss reference RS identifier (i.e., PUSCH-PathlossReferenceRS-Id) 0 to i−1 may be used for a PUSCH for i TRPs (and/or TO groups) (in a form of paired order).

Alternatively, when a M-TRP PUSCH is scheduled, it may be guaranteed that a base station will provide to a terminal a parameter for configured uplink grant of a RRC layer (i.e., rrc-ConfiguredUplinkGrant). And, a terminal may use a pathloss reference index (pathlossReferenceIndex) in a parameter for configured uplink grant of a RRC layer for any one TRP (and/or TO group) (i.e., a pathloss reference RS corresponding to a pathloss reference index (pathlossReferenceIndex) configured by a corresponding parameter is applied). And, a method used when a parameter for configured uplink grant of a RRC layer (i.e., rrc-ConfiguredUplinkGrant) is not provided as described above may be used for another TRP (and/or TO group).

ii) Closed-loop power control (Index l∈{0,1})
  Index 1: A different l value may be configured by a configuration of a base station for a PUSCH for i TRPs (and/or TO groups).

Embodiment 2) a Method of Configuring a Power Control Parameter for a PUSCH Scheduled by DCI Format 0_0 (in PUSCH Scheduling for i TRPs (and/or TO Groups)

i) Open-loop power control
  Index j: j is 2. Alternatively, different index j may be configured per each TRP (and/or TO group).
  Nominal power (P0_nominal): When a higher layer parameter for nominal power for a PUSCH with grant (i.e., p0-NominalWithGrant) is provided by a base station, i nominal power (P0_nominal) may be configured by a corresponding parameter. When the parameter (i.e., p0-NominalWithGrant) is not provided, P0_nominal(2)=P0_nominal(0) may be commonly configured for all TRPs (and/or TO groups) (i.e., nominal power for index j=0 (P0_nominal) is applied equally).

Alternatively, when a M-TRP PUSCH is scheduled, it may be guaranteed that a base station will provide to a terminal a higher layer parameter for nominal power for a PUSCH with grant (i.e., p0-NominalWithGrant). And, a terminal may use a higher layer parameter for nominal power for a PUSCH with grant (i.e., p0-NominalWithGrant) for any one TRP (and/or TO group) (i.e., nominal power configured by a corresponding parameter (P0_nominal) is applied). And, a terminal may use P0_nominal(0) for another TRP (and/or TO group). For example, P0_nominal (0) may be used for a primary/default TRP (and/or TO group).

P0_UE (i.e., power configured by a base station (P0)): A terminal, as a value of P0_UE for i TRPs (and/or TO groups), may use a parameter for a P0 and alpha set from 0-th to i−1-th PUSCH (i.e., P0-PUSCH-AlphaSet) in a parameter (i.e., p0-AlphaSets) for configuring a {p0-pusch, alpha} set for a PUSCH for each TRP (and/or TO group) (in a form or paired order). In other words, P0 corresponding to each of the configured indexes may be configured for the terminal in a P0 and alpha set for a PUSCH (i.e., P0-PUSCH-AlphaSet).

Alpha (i.e., power control related coefficient configured by a base station): A terminal, as an alpha value for i TRPs (and/or TO groups), may use a parameter for a P0 and alpha set from 0-th to i−1-th PUSCH (i.e., P0-PUSCH-AlphaSet) in a parameter (i.e., p0-AlphaSets) for configuring a {p0-pusch, alpha} set for a PUSCH for each TRP (and/or TO group) (in a form or paired order). In other words, an alpha corresponding to each of the configured indexes may be configured for the terminal in a P0 and alpha set for a PUSCH (i.e., P0-PUSCH-AlphaSet).

Pathloss reference RS: (When there is an activated spatial setting in a PUCCH resource (spatial relation information of a PUCCH) (i.e., PUCCH-spatialRelationInfo)), a terminal may use a pathloss reference RS configured in a parameter for PUCCH spatial relation information from a lowest index to i−1-th lowest index (PUCCH-SpatialRelationInfo) for each TRP (and/or TO group) (in a form or paired order).

Alternatively, when a PUCCH resource group configured for a terminal is mapped/connected/associated with each TRP (and/or TO group), a terminal may use a pathloss reference RS in PUCCH spatial relation information (PUCCH-SpatialRelationInfo) for a PUCCH resource having a lowest index in each PUCCH resource group for a TRP (and/or a TO group).

In another example, when a transmission panel identifier (ID) is explicitly configured/activated for a PUCCH resource (group), a terminal may use a pathloss reference RS configured in a PUCCH resource (group) of a lowest index among PUCCH resources (groups) that the same panel ID is configured/activated for each TRP (and/or TO group). In other words, it is considered that a transmission panel between a TRP (and/or a TO group) and a terminal may be mapped/connected/associated.

(When there is no activated spatial setting in a PUCCH resource (spatial relation information of a PUCCH) (i.e., PUCCH-spatialRelationInfo)), a terminal may use a pathloss reference RS corresponding to a 0-th to i−1-th PUSCH pathloss reference RS identifier (i.e., PUSCH-PathlossReferenceRS-Id) for each TRP (and/or TO group).

ii) Closed-loop power control (Index l∈{0,1})

Index 1: A different l value may be configured by a configuration of a base station for a PUSCH for i TRPs (and/or TO groups).

For one or more of some parameters (e.g., P0 and an alpha) of a power control related parameter for a PUSCH towards (transmitted to) different target TRP i (and/or TO group i) in the proposal 1 and embodiments (embodiment 1 and 2), a common parameter set common to target TRPs (and/or TO groups) may be configured. In other words, for parameter(s) other than one or more common parameter(s) (e.g., a pathloss reference RS, a closed-loop index), parameter(s) may be configured per target TRP (and/or TO group) as in the embodiments.

When a closed-loop index (here, closed-loop index $1 \in \{0, 1\}$) for a PUSCH towards (transmitted to) different target TRP i (and/or TO group i) is differently configured/indicated in the proposal 1 and embodiments (embodiment 1 and 2), in an indication by a TPC command field through DCI of a base station, a base station may indicate a power adjustment value for a different PUSCH with one DCI transmission through TPC command field(s) having a double bit field size (e.g., 4 bits) in order to reduce a TPC command overhead for a power adjustment value of a different closed-loop index. In other words, a TPC command value corresponding to (associated with) each closed-loop index for a PUSCH towards (transmitted to) each different target TRP i (and/or TO group i) may be indicated by extending the existing TPC command field by the number of TRPs (and/or TO groups). Here, a TPC command field indicating a TPC command value for a PUSCH towards (transmitted to) each different target TRP i (and/or TO group i) may be referred to as a first TPC command field, a second TPC command field, etc., respectively. And, a first TPC command field, a second TPC command field, etc. may be collectively referred to as a TPC command field. In other words, a TPC command value corresponding to (associated with) a closed-loop index for each different target TRP i (and/or TO group i) may be indicated by a TPC command field in DCI. In addition, only when a closed-loop index value for each different target TRP i (and/or TO group i) is different, a TPC command value corresponding to (associated with) a closed-loop index for each different target TRP i (and/or TO group i) may be separately indicated by a TPC command field in DCI.

Through the TPC command field, when TPC accumulation (i.e., tpc-Accumulation) is enabled/on as in the following table 12 (i.e., when a higher layer (e.g., RRC) parameter 'tpc-Accumulation' is not configured for a terminal) and/or when TPC accumulation (i.e., tpc-Accumulation) is disabled (i.e., when a higher layer (e.g., RRC) parameter 'tpc-Accumulation' is configured for a terminal, in this case, a terminal performs an absolute TPC operation), a base station may indicate every two TPC command values (i.e., corresponding to/associated with a closed-loop index value). In other words, whether a closed-loop index value for each different target TRP i (and/or TO group i) is individually indicated may be determined by higher layer signaling (e.g., RRC signaling).

Table 12 illustrates mapping to absolute and accumulated $\delta_{PUSCH,b,f,c}$ values or $\delta_{SRS,b,f,c}$ values of a transmit power control (TPC) command field in a DCI format scheduling PUSCH transmission or DCI format 2_2 or DCI format 2_3 having CRC scrambled by a TPC-PUSCH-RNTI.

TABLE 12

| TPC Command Field | Accumulated $\delta_{PUSCH,b,f,c}$ or $\delta_{SRS,b,f,c}$ [dB] | Absolute $\delta_{PUSCH,b,f,c}$ or $\delta_{SRS,b,f,c}$ [dB] |
|---|---|---|
| 0 | −1 | −4 |
| 1 | 0 | −1 |
| 2 | 1 | 1 |
| 3 | 3 | 4 |

In another example, in order to maintain a bit field size of the existing TPC command field of DCI and indicate a power adjustment value for a different closed-loop index (for M-TRP PUSCH power control), a joint encoding method as in the following table 13 may be used. A method as in the following table 13 may be considered as a joint encoding method capable of simultaneously instructing to power down a PUSCH towards the other TRP by assuming a situation in which as a terminal moves, a terminal moves away from any one TRP and instructs a base station to power up a PUSCH towards the any one TRP to indicate closed-loop power control simultaneously with getting closer to other TRP.

In other words, a TPC command value corresponding to/associated with a closed-loop index for each different target TRP i (and/or TO group i) may be indicated together by a single TPC command field having the same bit size as the existing TPC command field in DCI. In addition, as a value of a TPC command field changes, a TPC command value for each target TRP i (and/or TO group i) may be changed in inverse proportion (when any one increases, the other decreases, and vice versa).

Table 13 illustrates a joint encoding method for indicating a power adjustment value for a different closed-loop index by a single TPC command field.

TABLE 13

| TPC Command Field | Accumulated Power Adjustment Value [dB] | Absolute Power Adjustment Value [dB] |
|---|---|---|
| 0 | −1(for l = 0), 3(for l = 1) | −4(for l = 0), 4(for l = 1) |
| 1 | 0(for l = 0), 1(for l = 1) | −1(for l = 0), 1(for l = 1) |
| 2 | 1(for l = 0), 0(for l = 1) | 1(for l = 0), −1(for l = 1) |
| 3 | 3(for l = 0), −1(for l = 1) | 4(for l = 0), −4(for l = 1) |

In another example, a joint encoding method as in the following Table 14 may be utilized. A method in the following Table 14 may be considered as a joint encoding method of powering up or down all PUSCHs simultaneously by assuming a situation in which all move away from or get closer to a different TRP.

In other words, a TPC command value corresponding to/associated with a closed-loop index for different target TRP i (and/or TO group i) may be indicated together by a single TPC command field having the same bit size as the existing TPC command field in DCI. In addition, as a value of a TPC command field changes, a TPC command value for each target TRP i (and/or TO group i) may be changed in proportion (when any one increases, the other increases, and vice versa).

Table 14 illustrates a joint encoding method for indicating a power adjustment value for a different closed-loop index by a single TPC command field.

TABLE 14

| TPC Command Field | Accumulated Power Adjustment Value [dB] | Absolute Power Adjustment Value [dB] |
|---|---|---|
| 0 | −1(for l = 0), −1(for l = 1) | −4(for l = 0), −4(for l = 1) |
| 1 | 0(for l = 0), 1(for l = 1) | −1(for 1-0), −1(for l = 1) |
| 2 | 1(for l = 0), 1(for l = 1) | 1(for l = 0), 1(for l = 1) |
| 3 | 3(for l = 0), 3(for l = 1) | 4(for l = 0), 4(for l = 1) |

Examples of the joint encoding method may be switched or enabled/disabled by configuration/activation/deactivation of a base station.

In addition, in proposal 1, a higher layer configuration (e.g., a RRC configuration) for an additional power control parameter set (including at least one of power configured by a base station (P0), a power control related coefficient configured by a base station (alpha), a pathloss reference RS and/or a closed-loop index) for a PUSCH towards a secondary TRP (e.g., a target TRP i+1 (and/or TO group i+1)), not a primary/default TRP, may be optional. For example, it may be optionally configured when a base station schedules/configures/indicates M-TRP PUSCH transmission for a terminal. Accordingly, only when an additional power control parameter set for a PUSCH towards a secondary TRP (e.g., target TRP i+1 (and/or TO group i+1)) is configured by a higher layer configuration (e.g., a RRC configuration), the above-described TPC command field may be extended to indicate a TPC value corresponding to/associated with a closed-loop index for a secondary TRP (e.g., target TRP i+1 (and/or TO group i+1)). In addition, only when an additional power control parameter set for a PUSCH towards a secondary TRP (e.g., target TRP i+1 (and/or TO group i+1)) is configured by a higher layer configuration (e.g., a RRC configuration), a TPC command value corresponding to/associated with a closed-loop index for a secondary TRP (e.g., target TRP i+1 (and/or TO group i+1)) may be indicated by a joint encoding method in the above-described single TPC command field.

Proposal 2: A base station may configure/indicate to a terminal a specific control resource set (CORESET) (group) ID (e.g., a CORESET identity (ID), a CORESET pool index) and/or a search space set (SS set) identity (ID)) for configuring/indicating M-TRP transmission of a terminal PUSCH. When a terminal receives UL grant DCI through a CORESET/SS set corresponding to the specific CORESET (group) ID and/or SS set ID (i.e., when receiving a PDCCH carrying UL grant DCI), a terminal may transmit a PUSCH scheduled by DCI for different i TRPs and/or i TO groups (here, there are one or more TOs in a TO group). Here, each PUSCH corresponding to the different TRP and/or TO group may be transmitted based on M-TRP PUSCH power control information described in proposal 1.

A base station may configure/indicate repetition configuration information for a PUSCH (i.e., time domain resource allocation (TDRA) information, the number of repetitions, TO information, etc.) in a configuration for a CORESET and SS set corresponding to a specific CORESET (group) ID (e.g., a CORESET ID and/or a CORESET pool index) and/or a search space set (SS set) ID in the M-TRP PUSCH transmission.

In a specific example, when receiving UL grant DCI through a CORESET that M-TRP PDCCH repetition is configured (e.g., a CORESET that multiple TCI states are configured/activated for DCI reception from M-TRPs), a terminal may repetitively transmit a PUSCH scheduled by corresponding DCI based on PDCCH repetition configuration information (i.e., TDRA information, the number of repetitions, TO information, etc.). For example, the number of PUSCH repetitions by repetition information of the PDCCH may be configured/indicated as x times or 1/x times the number of PDCCH repetitions.

In Rel-17, M-TRP PDCCH repeat transmission and terminal reception may be introduced. In the present disclosure, an operation that QCL type-D RS(s) configured in a CORESET for receiving a corresponding M-TRP PDCCH (e.g., a CORESET that multiple TCI states are configured/activated for DCI reception from M-TRPs) are utilized as a transmission beam RS (i.e., a spatial relation RS) in PUSCH transmission corresponding to a different TRP and/or TO group is proposed. In addition, the QCL type-D RS(s) configured in a CORESET for receiving a corresponding M-TRP PDCCH may be used as a pathloss reference RS for open-loop power control in PUSCH transmission corresponding to a different TRP and/or TO group. Through a corresponding operation, when M-TRP repeat transmission of a PUSCH is performed according to whether M-TRP repeat transmission of a PDCCH is performed, a transmission beam and transmit power of a PUCCH corresponding to a different TRP/TO group may be determined.

Operations of the example may be also applied when UL grant DCI received by a terminal performs cross-carrier scheduling for a PUSCH in a CORESET that the M-TRP PDCCH repetition is configured.

Each TRP and/or TO group may be mapped to PUSCH repetition configured/indicated in the proposal 2. Specifically, when a PUSCH repetition value is 4, whether M-TRP repeat transmission will be performed as in i)(TRP 1/TO group 1, TRP 1/TO group 1, TRP 2/TO group 2, TRP 2/TO group 2) may be configured/indicated by a base station for 4 repeat transmission. In other words, when transmission is performed at a plurality of TOs by a repetition value of a PUSCH, and when a plurality of TOs are mapped/grouped to N (N is a natural number) TRPs (i.e., TO groups), a plurality of TOs may be circularly mapped to N TRPs (i.e., TO groups) in two TO units (here, 'two TO units' are for convenience of a description, and the present disclosure is not limited thereto. Accordingly, two TO units may be interpreted as a repetition value (i.e., the number of a plurality of TOs)/N units). Alternatively, whether M-TRP repeat transmission will be circularly performed as in ii) (TRP 1/TO group 1, TRP 2/TO group 2, TRP 1/TO group 1, TRP 2/TO group 2) may be configured/indicated by a base station. Alternatively, when transmission is performed at a plurality of TOs by a repetition value of a PUCCH, and when a plurality of TOs are mapped/grouped to N (N is a natural number) TRPs (i.e., TO groups), a plurality of TOs may be circularly mapped to N TRPs (i.e., TO groups) in one TO unit.

Alternatively, which mapping/response of mapping/response in i) or mapping/response in ii) above is applied by a base station may be configured/indicated by a base station.

If a M-TRP PUSCH and/or a repetition PUSCH by the proposal 1 and 2 collide with other PUSCH, a terminal may preferentially transmit the M-TRP PUSCH and/or repetition PUSCH. Alternatively, when CORESETs that a different QCL type-D RS is configured/activated collide in a time domain, a CORESET configured/indicated for M-TRP PUSCH transmission in the proposal 2 may take precedence (and a terminal gives up reception of other CORESET). In addition, if PDCCH overbooking occurs by exceeding a blind detection (BD)/control channel element (CCE) limit/capacity in a specific slot, a terminal may skip monitoring of a SS (set) having other lower priority by prioritizing a SS set configured/indicated for M-TRP PUSCH transmission in the proposal 2.

Figure 9:
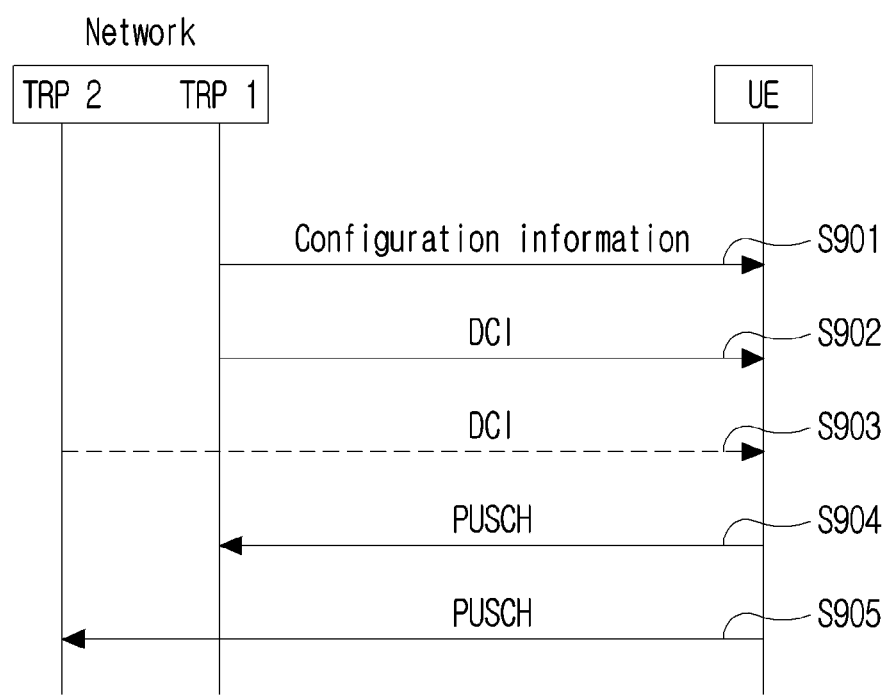
FIG. 9 illustrates a signaling procedure between a network and a terminal according to an embodiment of the present disclosure.

FIG. 9 illustrates a signaling procedure between a network and a terminal according to an embodiment of the present disclosure.

The after-described FIG. 9 illustrates signaling between a network (e.g., TRP 1, TRP, 2) and a terminal (i.e., UE) in a situation of multiple TRPs (i.e., M-TRPs, or multiple cells, hereinafter, all TRPs may be replaced with a cell) that methods proposed in the present disclosure (e.g., at least one of proposal 1 and 2) may be applied.

Figure 12:
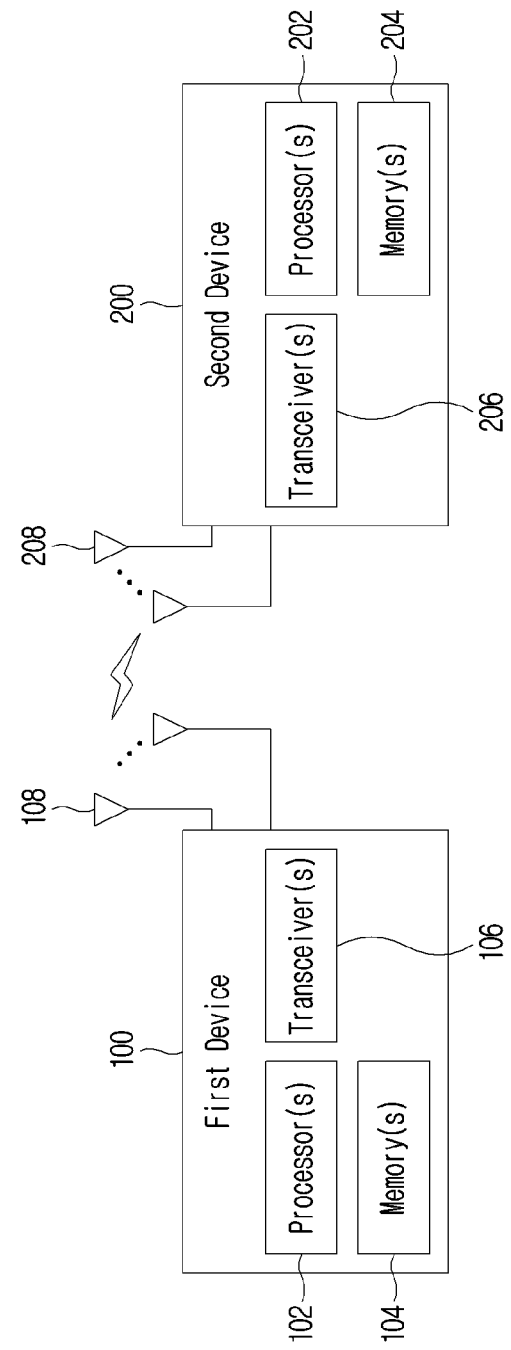
FIG. 12 illustrates a block diagram of a wireless communication device according to an embodiment of the present disclosure.

Here, UE/a network is just an example, and may be applied by being substituted with a variety of devices as described in the after-described FIG. 12. FIG. 9 is just for convenience of a description, and it does not limit a scope of the present disclosure. In addition, some step(s) shown in FIG. 9 may be omitted according to a situation and/or a configuration, etc.

In reference to FIG. 9, for convenience of a description, signaling between 2 TRPs and UE is considered, but it goes without saying that a corresponding signaling method may be extended and applied to signaling between multiple TRPs and multiple UE. In the following description, a network may be one base station including a plurality of TRPs or may be one cell including a plurality of TRPs. In an example, an ideal/non-ideal backhaul may be configured between TRP 1 and TRP 2 configuring a network. In addition, the following description is described based on multiple TRPs, but it may be equally extended and applied to transmission through multiple panels. In addition, in the present disclosure, an operation that a terminal receives a signal from TRP1/TRP2 may be interpreted/described (or may be an operation) as an operation that a terminal receives a signal from a network (through/with TRP1/2) and an operation that a terminal transmits a signal to TRP1/TRP2 may be interpreted/described (or may be an operation) as an operation that a terminal transmits a signal to a network (through/with TRP 1/TRP2) or may be inversely interpreted/described.

In addition, as described above, a "TRP" may be applied by being substituted with an expression such as a panel, an antenna array, a cell (e.g., a macro cell/a small cell/a pico cell, etc.), a transmission point (TP), a base station (gNB, etc.), etc. As described above, a TRP may be classified according to information on a CORESET group (or a CORESET pool) (e.g., an index, an identifier (ID)). In an example, when one terminal is configured to perform transmission and reception with multiple TRPs (or cells), it may mean that multiple CORESET groups (or CORESET pools) are configured for one terminal. Such a configuration on a CORESET group (or a CORESET pool) may be performed through higher layer signaling (e.g., RRC signaling, etc.). In addition, a base station may generally mean an object which performs transmission and reception of data with a terminal. For example, the base station may be a concept which includes at least one transmission point (TP), at least one transmission and reception point (TRP), etc. In addition, a TP and/or a TRP may include a panel, a transmission and reception unit, etc. of a base station.

In reference to FIG. 9, UE may receive configuration information through/with TRP 1 (and/or TRP 2) from a Network S901.

The configuration information may include information related to a configuration of a network (i.e., a TRP configuration)/resource information (resource allocation) related to transmission and reception based on multiple TRPs, etc. Here, the configuration information may be transmitted through higher layer signaling (e.g., RRC signaling, a MAC CE, etc.). In addition, when the configuration information is predefined or preconfigured, a corresponding step may be omitted.

In addition, the configuration information may be configuration information related to transmission of a PUSCH (e.g., M-TRP PUSCH transmission) described in the above-described proposal (at least one of proposal 1 and 2) (e.g., a higher layer IE (PUSCH-Config IE) for configuring a PUSCH/a higher layer IE (PUSCH-PowerControl 1E) for configuring a PUSCH power control parameter).

Here, the configuration information may include information related to PUSCH repeat transmission (e.g., information on whether PUSCH repeat transmission is performed and/or information on the number of PUSCH repetitions, etc.) at a plurality of transmission occasions (TO). In addition, it may include information related to PUSCH transmission for M-TRPs (i.e., information for specifying a TRP, mapping information between a TO group corresponding to/associated with each TRP and a plurality of transmission occasions (TO) that a PUSCH is repetitively transmitted, etc.). Here, each TO group may include one or more TOs. Mapping information between a TO group corresponding to/associated with each TRP and a plurality of transmission occasions (TO) may explicitly specify one or more TOs mapped to a TO group corresponding to/associated with each TRP. Alternatively, mapping information between a TO group corresponding to/associated with each TRP and a plurality of transmission occasions (TO) may include only specific pattern information, and according to corresponding pattern information, a TO group corresponding to/associated with each TRP and a plurality of transmission occasions (TO) may be implicitly mapped. For example, a plurality of TOs that a PUSCH is repetitively transmitted may be cyclically mapped to each TO group in two TO units (here, 'two TO units' are for convenience of a description, and the present disclosure is not limited thereto. Accordingly, two TO units may be interpreted as the number of a plurality of TOs (i.e., the number of repetitions)/N units (here, N is the number of TO groups, N is a natural number). Alternatively, a plurality of TOs that a PUSCH is repetitively transmitted may be cyclically mapped to N TO groups in one TO unit.

As in the above-described proposal 1, the configuration information may include N power control parameter sets for the PUSCH transmission associated with N TRPs (and/or N TO groups), respectively. Here, a power control parameter set may include at least one of an identifier (ID), a pathloss reference signal (RS) identifier (ID) and/or a closed-loop index of power (P0) configured by the base station for the PUSCH. For example, N power control parameter sets may be independently configured. In other words, some power control parameters in a different power parameter set may have the same value or a different value.

Here, although an explicit association relation is not configured by the configuration information, the N TO groups (i.e., corresponding to N TRPs) and the N power control parameter sets may be mapped one-to-one in a form of paired order based on the same index. Alternatively, an association relation between the N TO groups (i.e., corresponding to N TRPs) and the N power control parameter sets may be explicitly configured by the configuration information.

In addition, one or more parameters of an ID, a pathloss RS ID and/or a closed-loop index of the power (p0) configured by the base station for the PUSCH may be commonly configured for the N TRPs (and/or N TO groups). In other words, the configuration information may include power control parameter(s) for common PUSCH transmission for the N TRPs (and/or N TO groups).

In addition, as in the above-described proposal 1, the configuration information may include N spatial relation information on the PUSCH or configuration information on N CSI-RSs associated with the PUSCH. Here, the N power control parameter sets may correspond to N spatial relation information on the PUSCH or N CSI-RSs associated with the PUSCH. Here, although an explicit corresponding relation is not configured by the configuration information, the N power control parameter sets may be mapped one-to-one to N spatial relation information on the PUSCH or N CSI-RSs associated with the PUSCH in a form of paired order based on the same index. Alternatively, a corresponding relation between the N power control parameter sets and N spatial relation information on the PUSCH or N CSI-RSs associated with the PUSCH may be explicitly configured by the configuration information.

In addition, as in the above-described proposal 1, whether the N TPC command values for the N TRPs (and/or N TO groups) are indicated may be determined by higher layer signaling by the base station. The configuration information may include information on whether the N TPC command values for the N TRPs (and/or N TO groups) are indicated.

In addition, as in the above-described proposal 2, the configuration information may include information on a specific CORESET (group) and/or a search space set (SS set) (e.g., a CORESET ID, a SS set ID) and information related to repeat transmission corresponding to the specific CORESET and/or SS set (e.g., TDRA information, the number of repetitions, TO information, etc.). In addition, the configuration information may include repetition configuration information of a PDCCH and repeat transmission of a PUSCH may be performed based on repetition configuration information of a PDCCH (i.e., time domain resource allocation (TDRA) information, the number of repetitions, TO information, etc.).

In addition, the configuration information may include information on one or more QCL types and QCL reference signals (e.g., a reference RS of QCL type-D) for a CORESET for PDCCH reception (i.e., a PDCCH carrying DCI scheduling a M-TRP PUSCH). For example, a QCL type and a QCL reference signal (e.g., a reference RS of QCL type-D) corresponding to/associated with each of N TRPs (and/or N TO groups) may be configured. In this case, as a spatial relation reference signal of the PUSCH, a QCL type and a QCL reference signal (e.g., a reference RS of QCL type-D) of the CORESET associated with a TO group that the PUSCH is transmitted may be used.

Here, configuration information in proposal 2 (i.e., information related to a specific CORESET (group) and/or SS set) may be transmitted with configuration information in proposal 1 (i.e., information on power control parameter(s) for PUSCH transmission for the N TRPs (and/or N TO groups)) (e.g., in the same information element (IE)) or may be transmitted individually (e.g., in a different IE). For example, the configuration information in proposal 2 (i.e., information related to a specific CORESET (group) and/or SS set) may be included in configuration information on a PDCCH (e.g., PDCCH-Config).

UE may receive DCI through/with TRP 1 (and/or TRP 2) from a network S902, S903. DCI may be transmitted in (through) a PDCCH. The DCI may be UL grant DCI which schedules a PUSCH. When a PUSCH is a single DCI based PUSCH, UE may receive DCI from TRP 1 (or TRP 2) from a network S902. When the PUSCH is a multi-DCI based PUSCH, UE may receive DCI respectively through TRP 1 and TRP 2 from a network S902, S903.

Here, the DCI may be transmitted according to the above-described proposal (e.g., at least one of proposal 1, 2).

As in the above-described proposal 1, each TPC command value for the N TRPs (and/or N TO groups) may be indicated by DCI. Here, a TPC command value may correspond to/be associated with a closed-loop index for PUSCH power control. For example, a TPC command value corresponding to/associated with a corresponding closed-loop index may be used for power control adjustment for a specific closed-loop index (i.e., a closed-loop index may be used as a variable of a TPC command value). DCI may include a TPC command field and each TPC command value for N TRPs (and/or N TO groups) may be indicated by a TPC command field.

More specifically, each TPC command value for N TRPs (and/or N TO groups) may be indicated by an individual codepoint (or bit value) of a TPC command field. Here, the individual codepoint (or bit value) may be referred to as an individual TPC command field such as a first TPC command field, a second TPC command field, etc. In addition, for example, a TPC command field may be configured based on the number of pre-configured bits. For example, the number of pre-configured bits may be determined based on the number of a plurality of TRPs (and/or TO groups) (e.g., 2 bits*2 TRPs=4 bits).

In addition, each TPC command value for N TRPs (and/or N TO groups) may be indicated by a single codepoint of a TPC command field in a joint encoding method. In other words, a value of a TPC command field may represent a power adjustment value for a PUSCH of each TRP based on joint encoding.

In addition, as in the above-described proposal 2, the DCI may be transmitted based on at least one of CORESETs related to the plurality of TRPs (and/or TO groups). For example, the DCI (i.e., a PDCCH carrying DCI) may be received based on a specific CORESET (group) ID and/or SS set ID configured by the configuration information. As such, when the DCI is received in a specific CORESET (group) and/or SS set configured by the configuration information, repeat transmission at a plurality of TOs of a PUSCH based on N TRPs (and/or N TO groups) may be configured.

In addition, as described above, the configuration information may include information related to repeat transmission corresponding to the specific CORESET and/or SS set (e.g., TDRA information, the number of repetitions, TO information, etc.) and the PDCCH (i.e., a PDCCH carrying the DCI) may be repetitively received according to information related to the repeat transmission.

In addition, as described above, information on one or more different QCL types and QCL reference signals (e.g., a reference RS of QCL type-D) (e.g., corresponding to/associated with each of N TRPs (and/or N TO groups)) may be configured for a specific CORESET and the DCI may be transmitted in a specific CORESET that one or more different reference RSs of QCL type-D are configured.

UE transmits a PUSCH through/with TRP 1 (and/or TRP 2) to a network S904, S905.

Here, the PUSCH may be transmitted according to the above-described proposal (e.g., at least one of proposal 1, 2).

In other words, the PUSCH may be transmitted based on pre-determined PUSCH transmit power. Here, the pre-determined PUSCH transmit power may be determined based on the configuration information (and DCI).

The PUSCH may be repetitively transmitted at a plurality of transmission occasions (TO). And, the plurality of TOs may be mapped/grouped to N (N is a natural number) TO groups (i.e., N TRPs). Each TO group (i.e., each TRP) may include one or more TOs. Finally, a PUSCH may be repetitively transmitted to each TRP at a plurality of TOs and a TO group that a PUSCH is transmitted may be grouped/configured per each TRP. For example, a plurality of TOs that a PUSCH is repetitively transmitted may be cyclically mapped to each TO group in two TO units (here, 'two TO units' are for convenience of a description, and the present disclosure is not limited thereto. Accordingly, two TO units may be interpreted as the number of a plurality of TOs (i.e., the number of repetitions)/N units (here, N is the number of TO groups, N is a natural number)). Alternatively, a plurality of TOs that a PUSCH is repetitively transmitted may be cyclically mapped to N TO groups in one TO unit.

As in the above-described proposal 1, each TPC command value for the N TRPs (and/or N TO groups) may be indicated by DCI. Transmit power of the PUSCH may be determined based on a TPC command value associated with a TO group (and/or TRP) that the PUSCH is transmitted.

In addition, as in the above-described proposal 1, N power control parameter sets for the PUSCH transmission may be configured in N (N is a natural number) TO groups (i.e., N TRPs). Here, a power control parameter set may include at least one of an identifier (ID), a pathloss reference signal (RS) identifier (ID) and/or a closed-loop index of power (P0) configured by the base station for the PUSCH. And the N TO groups (i.e., N TRPs) may be associated with N power control parameter sets for the PUSCH transmission. Transmit power of a PUSCH may be determined based on association information between different (independent) power control parameter sets (e.g., an identifier (p0-PUSCH-Id)/a pathloss reference RS identifier of a PSCCH (pscch-PathlossReferenceRS-Id)/a closed-loop index of power (P0) configured by a base station) per each TRP. In other words, transmit power of a PUSCH may be determined based on a power control parameter set associated with a TO group that the PUSCH is transmitted.

In addition, as in the above-described proposal 2, when the DCI is received in a specific CORESET (group) and/or SS set configured by the configuration information, repeat transmission at a plurality of TOs of a PUSCH based on N TRPs (and/or N TO groups) may be configured. In addition, the PDCCH (i.e., a PDCCH carrying the DCI) may be repetitively received according to information related to repeat transmission corresponding to the specific CORESET and/or SS set (e.g., TDRA information, the number of repetitions, TO information, etc.) and repeat transmission of the PUSCH may be performed based on information related to repeat transmission of a PDCCH.

In addition, information on one or more QCL types and QCL reference signals (e.g., a reference RS of QCL type-D) corresponding to/associated with each of N TRPs (and/or N TO groups) may be configured for a CORESET for PDCCH reception (i.e., a PDCCH carrying DCI scheduling a M-TRP PUSCH). In this case, as a spatial relation reference signal of the PUSCH, a QCL type and a QCL reference signal (e.g., a reference RS of QCL type-D) of the CORESET associated with a TO group that the PUSCH is transmitted may be used.

Figure 10:
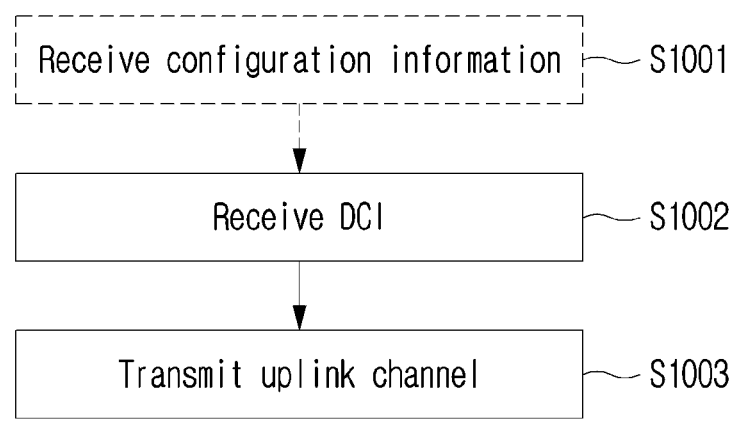
FIG. 10 illustrates an operation of a terminal for transmitting and receiving an uplink channel according to an embodiment of the present disclosure.

FIG. 10 illustrates an operation of a terminal for transmitting and receiving an uplink channel according to an embodiment of the present disclosure.

FIG. 10 illustrates an operation of a terminal based on the above-proposed methods (e.g., at least one of proposal 1 and proposal 2). An example in FIG. 10 is for convenience of a description, and it does not limit a scope of the present disclosure. Some step(s) illustrated in FIG. may be omitted according to a situation and/or a configuration. In addition, in FIG. 10, a terminal is just one example, and may be implemented by a device illustrated in the following FIG. 12. For example, a processor 102/202 in FIG. 12 may be controlled to transmit and receive a channel/a signal/data/information, etc. by using a transceiver 106/206 and may be also controlled to store a channel/a signal/data/information, etc. which will be transmitted or received in a memory 104/204.

In addition, an operation of FIG. 10 may be processed by one or more processors 102, 202 in FIG. 12. In addition, an operation of FIG. 10 may be stored in a memory (e.g., one or more memories 104, 204 of FIG. 12) in a form of a command/a program (e.g., an instruction, an executable code) for operating at least one processor of FIG. 12 (e.g., 102, 202).

In reference to FIG. 10, an operation of a terminal for 1 base station (i.e., 1 TRP) is considered for convenience of a description, but of course, an operation of a terminal may be extended and applied as an operation between multiple TRPs.

In reference to FIG. 10, a terminal may receive configuration information from a base station S1001.

The configuration information may be configuration information related to transmission of an uplink channel described in the above-described proposal (at least one of proposal 1 and 2) (e.g., a higher layer IE (PUSCH-Config IE) for configuring a PUSCH/a higher layer IE (PUSCH-PowerControl IE) for configuring a PUSCH power control parameter). For example, configuration information may include information on whether N TPC command values (N is a natural number) are indicated by DCI scheduling a PUSCH. In another example, configuration information may include information on whether N TPC command values (N is a natural number) are indicated by DCI scheduling a PUSCH.

The uplink channel may be a PUSCH or a PUCCH.

In addition, in particular, in order to support M-TRP transmission of a PUSCH, S1001 is described in more detail.

The configuration information may include information related to a configuration of a network (i.e., a TRP configuration)/resource information (resource allocation) related to transmission and reception based on multiple TRPs, etc. Here, the configuration information may be transmitted through higher layer signaling (e.g., RRC signaling, a MAC CE, etc.). In addition, when the configuration information is predefined or preconfigured, a corresponding step may be omitted.

In addition, the configuration information may be configuration information related to transmission of a PUSCH (e.g., M-TRP PUSCH transmission) described in the above-described proposal (at least one of proposal 1 and 2) (e.g., a higher layer IE (PUSCH-Config IE) for configuring a PUSCH/a higher layer IE (PUSCH-PowerControl IE) for configuring a PUSCH power control parameter).

Here, the configuration information may include information related to PUSCH repeat transmission (e.g., information on whether PUSCH repeat transmission is performed and/or information on the number of PUSCH repetitions, etc.) at a plurality of transmission occasions (TO). In addition, it may include information related to PUSCH transmission for M-TRPs (i.e., information for specifying a TRP, mapping information between a TO group corresponding to/associated with each TRP and a plurality of transmission occasions (TO) that a PUSCH is repetitively transmitted, etc.). Here, each TO group may include one or more TOs. Mapping information between a TO group corresponding to/associated with each TRP and a plurality of transmission occasions (TO) may explicitly specify one or more TOs mapped to a TO group corresponding to/associated with each TRP. Alternatively, mapping information between a TO group corresponding to/associated with each TRP and a plurality of transmission occasions (TO) may include only specific pattern information, and according to corresponding pattern information, a TO group corresponding to/associated with each TRP and a plurality of transmission occasions (TO) may be implicitly mapped. For example, a plurality of TOs that a PUSCH is repetitively transmitted may be cyclically mapped to each TO group in two TO units (here, 'two TO units' are for convenience of a description, and the present disclosure is not limited thereto. Accordingly, two TO units may be interpreted as the number of a plurality of TOs (i.e., the number of repetitions)/N units (here, N is the number of TO groups, N is a natural number)). Alternatively, a plurality of TOs that a PUSCH is repetitively transmitted may be cyclically mapped to N TO groups in one TO unit.

As in the above-described proposal 1, the configuration information may include N power control parameter sets for the PUSCH transmission associated with N TRPs (and/or N TO groups), respectively. Here, a power control parameter set may include at least one of an identifier (ID), a pathloss reference signal (RS) identifier (ID) and/or a closed-loop index of power (P0) configured by the base station for the PUSCH. For example, N power control parameter sets may be independently configured. In other words, some power control parameters in a different power parameter set may have the same value or a different value.

Here, although an explicit association relation is not configured by the configuration information, the N TO groups (i.e., corresponding to N TRPs) and the N power control parameter sets may be mapped one-to-one in a form of paired order based on the same index. Alternatively, an association relation between the N TO groups (i.e., corresponding to N TRPs) and the N power control parameter sets may be explicitly configured by the configuration information.

In addition, one or more parameters of an ID, a pathloss RS ID and/or a closed-loop index of the power (p0) configured by the base station for the PUSCH may be commonly configured for the N TRPs (and/or N TO groups). In other words, the configuration information may include power control parameter(s) for common PUSCH transmission for the N TRPs (and/or N TO groups).

In addition, as in the above-described proposal 1, the configuration information may include N spatial relation information on the PUSCH or configuration information on N CSI-RSs associated with the PUSCH. Here, the N power control parameter sets may correspond to N spatial relation information on the PUSCH or N CSI-RSs associated with the PUSCH. Here, although an explicit corresponding relation is not configured by the configuration information, the N power control parameter sets may be mapped one-to-one to N spatial relation information on the PUSCH or N CSI-RSs associated with the PUSCH in a form of paired order based on the same index. Alternatively, a corresponding relation between the N power control parameter sets and N spatial relation information on the PUSCH or N CSI-RSs associated with the PUSCH may be explicitly configured by the configuration information.

In addition, as in the above-described proposal 1, whether the N TPC command values for the N TRPs (and/or N TO groups) are indicated may be determined by higher layer signaling by the base station. The configuration information may include information on whether the N TPC command values for the N TRPs (and/or N TO groups) are indicated.

In addition, as in the above-described proposal 2, the configuration information may include information on a specific CORESET (group) and/or a search space set (SS set) (e.g., a CORESET ID, a SS set ID) and information related to repeat transmission corresponding to the specific CORESET and/or SS set (e.g., TDRA information, the number of repetitions, TO information, etc.). In addition, the configuration information may include repetition configuration information of a PDCCH and repeat transmission of a PUSCH may be performed based on repetition configuration information of a PDCCH (i.e., time domain resource allocation (TDRA) information, the number of repetitions, TO information, etc.).

In addition, the configuration information may include information on one or more QCL types and QCL reference signals (e.g., a reference RS of QCL type-D) for a CORESET for PDCCH reception (i.e., a PDCCH carrying DCI scheduling a M-TRP PUSCH). For example, a QCL type and a QCL reference signal (e.g., a reference RS of QCL type-D) corresponding to/associated with each of N TRPs (and/or N TO groups) may be configured. In this case, as a spatial relation reference signal of the PUSCH, a QCL type and a QCL reference signal (e.g., a reference RS of QCL type-D) of the CORESET associated with a TO group that the PUSCH is transmitted may be used.

Here, configuration information in proposal 2 (i.e., information related to a specific CORESET (group) and/or SS set) may be transmitted with configuration information in proposal 1 (i.e., information on power control parameter(s) for PUSCH transmission for the N TRPs (and/or N TO groups)) (e.g., in the same information element (IE)) or may be transmitted individually (e.g., in a different IE). For example, the configuration information in proposal 2 (i.e., information related to a specific CORESET (group) and/or SS set) may be included in configuration information on a PDCCH (e.g., PDCCH-Config).

A terminal receives DCI from a base station S1002.

Here, the DCI may be transmitted according to the above-described proposal (e.g., at least one of proposal 1, 2). DCI may be transmitted in (through) a PDCCH.

The DCI may indicate N (N is a natural number) TPC command values for transmission of an uplink channel. In other words, DCI may include a TPC command field and N TPC command values may be indicated by a TPC command field. Here, a TPC command value may correspond to/be associated with a closed-loop index for power control of an uplink channel. For example, a TPC command value corresponding to/associated with a corresponding closed-loop index may be used for power control adjustment for a specific closed-loop index (i.e., a closed-loop index may be used as a variable of a TPC command value).

The uplink channel may be a PUSCH or a PUCCH. For example, when the uplink channel is a PUCCH, the DCI may correspond to DCI scheduling a PDSCH and the PUCCH may carry acknowledgement (ACK) information for the PDSCH. In addition, a PUCCH resource that the PUCCH is transmitted may be determined based on a PUCCH resource indicator (PRI) in the DCI. On the other hand, when the uplink channel is a PUSCH, the DCI may correspond to DCI scheduling a corresponding PDSCH. In particular, in order to support M-TRP transmission of a PUSCH, S1002 is described in more detail.

As in the above-described proposal 1, each TPC command value for the N TRPs (and/or N TO groups) may be indicated by DCI. Here, a TPC command value may correspond to/be associated with a closed-loop index for PUSCH power control. DCI may include a TPC command field and each TPC command value for N TRPs (and/or N TO groups) may be indicated by a TPC command field.

More specifically, each TPC command value for N TRPs (and/or N TO groups) may be indicated by an individual codepoint (or bit value) of a TPC command field. Here, the individual codepoint (or bit value) may be referred to as an individual TPC command field such as a first TPC command field, a second TPC command field, etc. In addition, for example, a TPC command field may be configured based on the number of pre-configured bits. For example, the number of pre-configured bits may be determined based on the number of a plurality of TRPs (and/or TO groups) (e.g., 2 bits*2 TRPs=4 bits).

In addition, each TPC command value for N TRPs (and/or N TO groups) may be indicated by a single codepoint of a TPC command field in a joint encoding method. In other words, a value of a TPC command field may represent a power adjustment value for a PUSCH of each TRP based on joint encoding.

In addition, as in the above-described proposal 2, the DCI may be transmitted based on at least one of CORESETs related to the plurality of TRPs (and/or TO groups). For example, the DCI (i.e., a PDCCH carrying DCI) may be received based on a specific CORESET (group) ID and/or SS set ID configured by the configuration information. As such, when the DCI is received in a specific CORESET (group) and/or SS set configured by the configuration information, repeat transmission at a plurality of TOs of a PUSCH based on N TRPs (and/or N TO groups) may be configured.

In addition, as described above, the configuration information may include information related to repeat transmission corresponding to the specific CORESET and/or SS set (e.g., TDRA information, the number of repetitions, TO information, etc.) and the PDCCH (i.e., a PDCCH carrying the DCI) may be repetitively received according to information related to the repeat transmission.

In addition, as described above, information on one or more different QCL types and QCL reference signals (e.g., a reference RS of QCL type-D) (e.g., corresponding to/associated with each of N TRPs (and/or N TO groups)) may be configured for a specific CORESET and the DCI may be transmitted in a specific CORESET that one or more different reference RSs of QCL type-D are configured.

A terminal transmits an uplink channel to a base station S1003.

Here, the uplink channel may be transmitted according to the above-described proposal (e.g., at least one of proposal 1, 2).

Transmit power of the uplink channel may be determined based on any one TPC command value of N TPC command values indicated by the DCI.

In other words, the uplink channel may be transmitted based on pre-determined transmit power for an uplink channel. Here, the pre-determined transmit power for an uplink channel may be determined based on the configuration information (and DCI).

Here, the uplink channel may be a PUSCH or a PUCCH. For example, when the uplink channel is a PUCCH, the PUCCH may be transmitted on a PUCCH resource determined based on a PRI in the DCI. On the other hand, when the uplink channel is a PUSCH, a PDSCH may be transmitted on a time/frequency resource scheduled by the DCI.

In addition, in particular, in order to support M-TRP transmission of a PUSCH, S1003 is described in more detail.

The PUSCH may be repetitively transmitted at a plurality of transmission occasions (TO). And, the plurality of TOs may be mapped/grouped to N (N is a natural number) TO groups (i.e., N TRPs). Each TO group (i.e., each TRP) may include one or more TOs. Finally, a PUSCH may be repetitively transmitted to each TRP at a plurality of TOs and a TO group that a PUSCH is transmitted may be grouped/configured per each TRP. For example, a plurality of TOs that a PUSCH is repetitively transmitted may be cyclically mapped to each TO group in two TO units (here, 'two TO units' are for convenience of a description, and the present disclosure is not limited thereto. Accordingly, two TO units may be interpreted as the number of a plurality of TOs (i.e., the number of repetitions)/N units (here, N is the number of TO groups, N is a natural number)). Alternatively, a plurality of TOs that a PUSCH is repetitively transmitted may be cyclically mapped to N TO groups in one TO unit.

As in the above-described proposal 1, each TPC command value for the N TRPs (and/or N TO groups) may be indicated by DCI. Transmit power of the PUSCH may be determined based on a TPC command value associated with a TO group (and/or TRP) that the PUSCH is transmitted.

In addition, as in the above-described proposal 1, N power control parameter sets for the PUSCH transmission may be configured in N (N is a natural number) TO groups (i.e., N TRPs). Here, a power control parameter set may include at least one of an identifier (ID), a pathloss reference signal (RS) identifier (ID) and/or a closed-loop index of power (P0) configured by the base station for the PUSCH. And the N TO groups (i.e., N TRPs) may be associated with N power control parameter sets for the PUSCH transmission. Transmit power of a PUSCH may be determined based on association information between different (independent) power control parameter sets (e.g., an identifier (p0-PUSCH-Id)/a pathloss reference RS identifier of a PSCCH (pscch-PathlossReferenceRS-Id)/a closed-loop index of power (P0) configured by a base station) per each TRP. In other words, transmit power of a PUSCH may be determined based on a power control parameter set associated with a TO group that the PUSCH is transmitted.

In addition, as in the above-described proposal 2, when the DCI is received in a specific CORESET (group) and/or SS set configured by the configuration information, repeat transmission at a plurality of TOs of a PUSCH based on N TRPs (and/or N TO groups) may be configured. In addition, the PDCCH (i.e., a PDCCH carrying the DCI) may be repetitively received according to information related to repeat transmission corresponding to the specific CORESET and/or SS set (e.g., TDRA information, the number of repetitions, TO information, etc.) and repeat transmission of the PUSCH may be performed based on information related to repeat transmission of a PDCCH.

In addition, information on one or more QCL types and QCL reference signals (e.g., a reference RS of QCL type-D) corresponding to/associated with each of N TRPs (and/or N TO groups) may be configured for a CORESET for PDCCH reception (i.e., a PDCCH carrying DCI scheduling a M-TRP PUSCH). In this case, as a spatial relation reference signal of the PUSCH, a QCL type and a QCL reference signal (e.g., a reference RS of QCL type-D) of the CORESET associated with a TO group that the PUSCH is transmitted may be used.

Figure 11:
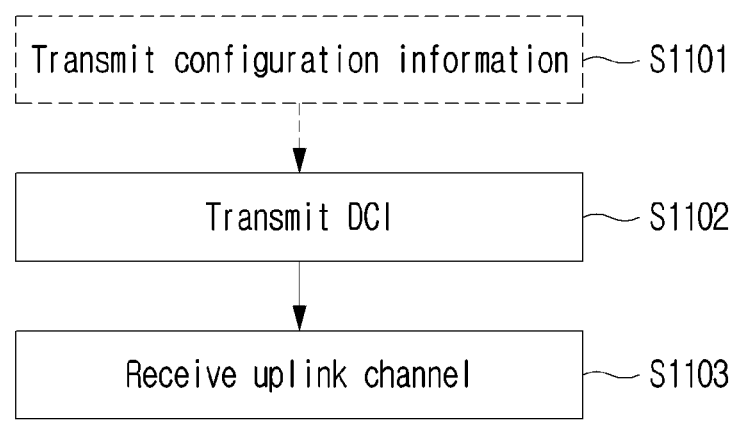
FIG. 11 illustrates an operation of a base station for transmitting and receiving an uplink channel according to an embodiment of the present disclosure.

FIG. 11 illustrates an operation of a base station for transmitting and receiving an uplink channel according to an embodiment of the present disclosure.

FIG. 11 illustrates an operation of a base station based on the above-proposed methods (e.g., at least one of proposal 1 and proposal 2). An example in FIG. 11 is for convenience of a description, and it does not limit a scope of the present disclosure. Some step(s) illustrated in FIG. 11 may be omitted according to a situation and/or a configuration. In addition, in FIG. 11, a base station is just one example, and may be implemented by a device illustrated in the following FIG. 11. For example, a processor 102/202 in FIG. 12 may be controlled to transmit and receive a channel/a signal/data/information, etc. by using a transceiver 106/206 and may be also controlled to store a channel/a signal/data/information, etc. which will be transmitted or received in a memory 104/204.

In addition, an operation of FIG. 11 may be processed by one or more processors 102, 202 in FIG. 12. In addition, an operation of FIG. 11 may be stored in a memory (e.g., one or more memories 104, 204 of FIG. 12) in a form of a command/a program (e.g., an instruction, an executable code) for operating at least one processor of FIG. 12 (e.g., 102, 202).

In reference to FIG. 11, an operation of 1 base station (i.e., 1 TRP) is considered for convenience of a description, but of course, it may be extended and applied as an operation between multiple TRPs.

In reference to FIG. 11, a base station may transmit configuration information to a terminal S1101.

The configuration information may be configuration information related to transmission of an uplink channel described in the above-described proposal (at least one of proposal 1 and 2) (e.g., a higher layer IE (PUSCH-Config IE) for configuring a PUSCH/a higher layer IE (PUSCH-PowerControl IE) for configuring a PUSCH power control parameter). For example, configuration information may include information on whether N TPC command values (N is a natural number) are indicated by DCI associated with an uplink channel. In another example, configuration information may include information on whether N TPC command values (N is a natural number) are indicated by DCI scheduling a PUSCH.

The uplink channel may be a PUSCH or a PUCCH.

In addition, in particular, in order to support M-TRP transmission of a PUSCH, S1101 is described in more detail.

The configuration information may include information related to a configuration of a network (i.e., a TRP configuration)/resource information (resource allocation) related to transmission and reception based on multiple TRPs, etc. Here, the configuration information may be transmitted through higher layer signaling (e.g., RRC signaling, a MAC CE, etc.). In addition, when the configuration information is predefined or preconfigured, a corresponding step may be omitted.

In addition, the configuration information may be configuration information related to transmission of a PUSCH (e.g., M-TRP PUSCH transmission) described in the above-described proposal (at least one of proposal 1 and 2) (e.g., a higher layer IE (PUSCH-Config IE) for configuring a PUSCH/a higher layer IE (PUSCH-PowerControl 1E) for configuring a PUSCH power control parameter).

Here, the configuration information may include information related to PUSCH repeat transmission (e.g., information on whether PUSCH repeat transmission is performed and/or information on the number of PUSCH repetitions, etc.) at a plurality of transmission occasions (TO). In addition, it may include information related to PUSCH transmission for M-TRPs (i.e., information for specifying a TRP, mapping information between a TO group corresponding to/associated with each TRP and a plurality of transmission occasions (TO) that a PUSCH is repetitively transmitted, etc.). Here, each TO group may include one or more TOs. Mapping information between a TO group corresponding to/associated with each TRP and a plurality of transmission occasions (TO) may explicitly specify one or more TOs mapped to a TO group corresponding to/associated with each TRP. Alternatively, mapping information between a TO group corresponding to/associated with each TRP and a plurality of transmission occasions (TO) may include only specific pattern information, and according to corresponding pattern information, a TO group corresponding to/associated with each TRP and a plurality of transmission occasions (TO) may be implicitly mapped. For example, a plurality of TOs that a PUSCH is repetitively transmitted may be cyclically mapped to each TO group in two TO units (here, 'two TO units' are for convenience of a description, and the present disclosure is not limited thereto. Accordingly, two TO units may be interpreted as the number of a plurality of TOs (i.e., the number of repetitions)/N units (here, N is the number of TO groups, N is a natural number)). Alternatively, a plurality of TOs that a PUSCH is repetitively transmitted may be cyclically mapped to N TO groups in one TO unit.

As in the above-described proposal 1, the configuration information may include N power control parameter sets for the PUSCH transmission associated with N TRPs (and/or N TO groups), respectively. Here, a power control parameter set may include at least one of an identifier (ID), a pathloss reference signal (RS) identifier (ID) and/or a closed-loop index of power (P0) configured by the base station for the PUSCH. For example, N power control parameter sets may be independently configured. In other words, some power control parameters in a different power parameter set may have the same value or a different value.

Here, although an explicit association relation is not configured by the configuration information, the N TO groups (i.e., corresponding to N TRPs) and the N power control parameter sets may be mapped one-to-one in a form of paired order based on the same index. Alternatively, an association relation between the N TO groups (i.e., corresponding to N TRPs) and the N power control parameter sets may be explicitly configured by the configuration information.

In addition, one or more parameters of an ID, a pathloss RS ID and/or a closed-loop index of the power (p0) configured by the base station for the PUSCH may be commonly configured for the N TRPs (and/or N TO groups). In other words, the configuration information may include power control parameter(s) for common PUSCH transmission for the N TRPs (and/or N TO groups).

In addition, as in the above-described proposal 1, the configuration information may include N spatial relation information on the PUSCH or configuration information on N CSI-RSs associated with the PUSCH. Here, the N power control parameter sets may correspond to N spatial relation information on the PUSCH or N CSI-RSs associated with the PUSCH. Here, although an explicit corresponding relation is not configured by the configuration information, the N power control parameter sets may be mapped one-to-one to N spatial relation information on the PUSCH or N CSI-RSs associated with the PUSCH in a form of paired order based on the same index. Alternatively, a corresponding relation between the N power control parameter sets and N spatial relation information on the PUSCH or N CSI-RSs associated with the PUSCH may be explicitly configured by the configuration information.

In addition, as in the above-described proposal 1, whether the N TPC command values for the N TRPs (and/or N TO groups) are indicated may be determined by higher layer signaling by the base station. The configuration information may include information on whether the N TPC command values for the N TRPs (and/or N TO groups) are indicated.

In addition, as in the above-described proposal 2, the configuration information may include information on a specific CORESET (group) and/or a search space set (SS set) (e.g., a CORESET ID, a SS set ID) and information related to repeat transmission corresponding to the specific CORESET and/or SS set (e.g., TDRA information, the number of repetitions, TO information, etc.). In addition, the configuration information may include repetition configuration information of a PDCCH and repeat transmission of a PUSCH may be performed based on repetition configuration information of a PDCCH (i.e., time domain resource allocation (TDRA) information, the number of repetitions, TO information, etc.).

In addition, the configuration information may include information on one or more QCL types and QCL reference signals (e.g., a reference RS of QCL type-D) for a CORESET for PDCCH reception (i.e., a PDCCH carrying DCI scheduling a M-TRP PUSCH). For example, a QCL type and a QCL reference signal (e.g., a reference RS of QCL type-D) corresponding to/associated with each of N TRPs (and/or N TO groups) may be configured. In this case, as a spatial relation reference signal of the PUSCH, a QCL type and a QCL reference signal (e.g., a reference RS of QCL type-D) of the CORESET associated with a TO group that the PUSCH is transmitted may be used.

Here, configuration information in proposal 2 (i.e., information related to a specific CORESET (group) and/or SS set) may be transmitted with configuration information in proposal 1 (i.e., information on power control parameter(s) for PUSCH transmission for the N TRPs (and/or N TO groups)) (e.g., in the same information element (IE)) or may be transmitted individually (e.g., in a different IE). For example, the configuration information in proposal 2 (i.e., information related to a specific CORESET (group) and/or SS set) may be included in configuration information on a PDCCH (e.g., PDCCH-Config).

A base station transmits DCI to a terminal S1102.

Here, the DCI may be transmitted according to the above-described proposal (e.g., at least one of proposal 1, 2). DCI may be transmitted in (through) a PDCCH.

The DCI may indicate N (N is a natural number) TPC command values for transmission of an uplink channel. In other words, DCI may include a TPC command field and N TPC command values may be indicated by a TPC command field. Here, a TPC command value may correspond to/be associated with a closed-loop index for power control of an uplink channel. For example, a TPC command value corresponding to/associated with a corresponding closed-loop index may be used for power control adjustment for a specific closed-loop index (i.e., a closed-loop index may be used as a variable of a TPC command value).

The uplink channel may be a PUSCH or a PUCCH. For example, when the uplink channel is a PUCCH, the DCI may correspond to DCI scheduling a PDSCH and the PUCCH may carry acknowledgement (ACK) information for the PDSCH. In addition, a PUCCH resource that the PUCCH is transmitted may be determined based on a PUCCH resource indicator (PRI) in the DCI. On the other hand, when the uplink channel is a PUSCH, the DCI may correspond to DCI scheduling a corresponding PDSCH.

In particular, in order to support M-TRP transmission of a PUSCH, S1102 is described in more detail.

As in the above-described proposal 1, each TPC command value for the N TRPs (and/or N TO groups) may be indicated by DCI. Here, a TPC command value may correspond to/be associated with a closed-loop index for PUSCH power control. DCI may include a TPC command field and each TPC command value for N TRPs (and/or N TO groups) may be indicated by a TPC command field.

More specifically, each TPC command value for N TRPs (and/or N TO groups) may be indicated by an individual codepoint (or bit value) of a TPC command field. Here, the individual codepoint (or bit value) may be referred to as an individual TPC command field such as a first TPC command field, a second TPC command field, etc. In addition, for example, a TPC command field may be configured based on the number of pre-configured bits. For example, the number of pre-configured bits may be determined based on the number of a plurality of TRPs (and/or TO groups) (e.g., 2 bits*2 TRPs=4 bits).

In addition, each TPC command value for N TRPs (and/or N TO groups) may be indicated by a single codepoint of a TPC command field in a joint encoding method. In other words, a value of a TPC command field may represent a power adjustment value for a PUSCH of each TRP based on joint encoding.

In addition, as in the above-described proposal 2, the DCI may be transmitted based on at least one of CORESETs related to the plurality of TRPs (and/or TO groups). For example, the DCI (i.e., a PDCCH carrying DCI) may be configured based on a specific CORESET (group) ID and/or SS set ID configured by the configuration information. As such, when the DCI is received in a specific CORESET (group) and/or SS set configured by the configuration information, repeat transmission at a plurality of TOs of a PUSCH based on N TRPs (and/or N TO groups) may be configured.

In addition, as described above, the configuration information may include information related to repeat transmission corresponding to the specific CORESET and/or SS set (e.g., TDRA information, the number of repetitions, TO information, etc.) and the PDCCH (i.e., a PDCCH carrying the DCI) may be repetitively received according to information related to the repeat transmission.

In addition, as described above, information on one or more different QCL types and QCL reference signals (e.g., a reference RS of QCL type-D) (e.g., corresponding to/associated with each of N TRPs (and/or N TO groups)) may be configured for a specific CORESET and the DCI may be transmitted in a specific CORESET that one or more different reference RSs of QCL type-D are configured.

A base station receives an uplink channel from a terminal S1103.

Here, the uplink channel may be transmitted according to the above-described proposal (e.g., at least one of proposal 1, 2).

Transmit power of the uplink channel may be determined based on any one TPC command value of N TPC command values indicated by the DCI. In other words, the uplink channel may be transmitted based on pre-determined transmit power for an uplink channel. Here, the pre-determined transmit power of an uplink channel may be determined based on the configuration information (and DCI).

Here, the uplink channel may be a PUSCH or a PUCCH. For example, when the uplink channel is a PUCCH, the PUCCH may be transmitted on a PUCCH resource determined based on a PRI in the DCI. On the other hand, when the uplink channel is a PUSCH, a PDSCH may be transmitted on a time/frequency resource scheduled by the DCI.

In addition, in particular, in order to support M-TRP transmission of a PUSCH, S1003 is described in more detail.

The PUSCH may be repetitively transmitted at a plurality of transmission occasions (TO). And, the plurality of TOs may be mapped/grouped to N (N is a natural number) TO groups (i.e., N TRPs). Each TO group (i.e., each TRP) may include one or more TOs. Finally, a PUSCH may be repetitively transmitted to each TRP at a plurality of TOs and a TO group that a PUSCH is transmitted may be grouped/configured per each TRP. For example, a plurality of TOs that a PUSCH is repetitively transmitted may be cyclically mapped to each TO group in two TO units (here, 'two TO units' are for convenience of a description, and the present disclosure is not limited thereto. Accordingly, two TO units may be interpreted as the number of a plurality of TOs (i.e., the number of repetitions)/N units (here, N is the number of TO groups, N is a natural number)). Alternatively, a plurality of TOs that a PUSCH is repetitively transmitted may be cyclically mapped to N TO groups in one TO unit.

As in the above-described proposal 1, each TPC command value for the N TRPs (and/or N TO groups) may be indicated by DCI. Transmit power of the PUSCH may be determined based on a TPC command value associated with a TO group (and/or TRP) that the PUSCH is transmitted.

In addition, as in the above-described proposal 1, N power control parameter sets for the PUSCH transmission may be configured in N (N is a natural number) TO groups (i.e., N TRPs). Here, a power control parameter set may include at least one of an identifier (ID), a pathloss reference signal (RS) identifier (ID) and/or a closed-loop index of power (P0) configured by the base station for the PUSCH. And the N TO groups (i.e., N TRPs) may be associated with N power control parameter sets for the PUSCH transmission. Transmit power of a PUSCH may be determined based on association information between different (independent) power control parameter sets (e.g., an identifier (p0-PUSCH-Id)/a pathloss reference RS identifier of a PSCCH (pscch-PathlossReferenceRS-Id)/a closed-loop index of power (P0) configured by a base station) per each TRP. In other words, transmit power of a PUSCH may be determined based on a power control parameter set associated with a TO group that the PUSCH is transmitted.

In addition, as in the above-described proposal 2, when the DCI is received in a specific CORESET (group) and/or SS set configured by the configuration information, repeat transmission at a plurality of TOs of a PUSCH based on N TRPs (and/or N TO groups) may be configured. In addition, the PDCCH (i.e., a PDCCH carrying the DCI) may be repetitively received according to information related to repeat transmission corresponding to the specific CORESET and/or SS set (e.g., TDRA information, the number of repetitions, TO information, etc.) and repeat transmission of the PUSCH may be performed based on information related to repeat transmission of a PDCCH.

In addition, information on one or more QCL types and QCL reference signals (e.g., a reference RS of QCL type-D) corresponding to/associated with each of N TRPs (and/or N TO groups) may be configured for a CORESET for PDCCH reception (i.e., a PDCCH carrying DCI scheduling a M-TRP PUSCH). In this case, as a spatial relation reference signal of the PUSCH, a QCL type and a QCL reference signal (e.g., a reference RS of QCL type-D) of the CORESET associated with a TO group that the PUSCH is transmitted may be used.

General Device to which the Present Disclosure May be Applied

FIG. 12 is a diagram which illustrates a block diagram of a wireless communication device according to an embodiment of the present disclosure.

In reference to FIG. 12, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:

1. A method performed by a terminal in a wireless communication system, the method comprising:
   receiving, from a base station, first configuration information related to a physical uplink shared channel (PUSCH);
   receiving, from the base station, single downlink control information (DCI); and
   transmitting, to the base station, PUSCH transmissions,
   wherein whether the single DCI includes one transmit power control (TPC) command value or two TPC command values is configured by the first configuration information,
   wherein one TPC command value is indicated with a bit size of N bits (N is a natural number), and the two TPC command values is indicated with a bit size of 2*N bits, and
   wherein based on i) the single DCI including the two TPC command values and ii) the PUSCH transmissions being associated with closed-loop indexes 0 and 1, the first TPC command value among the two TPC command values is applied for determining PUSCH transmission power for a closed-loop index 0 and the second TPC command value among the two TPC command values is applied for determining PUSCH transmission power for a closed-loop index 1.

2. The method of claim 1,
wherein the PUSCH transmissions are repetitively transmitted at a plurality of transmission occasions (TO),
wherein the plurality of TOs are mapped to two TO groups, each of two TO groups including one or more TOs, and
wherein PUSCH transmission power is determined based on a TPC command value associated with a TO group that PUSCH transmission is transmitted among the two TPC command values.

3. The method of claim 1,
wherein the single DCI includes a transmit power control (TPC) command field, and
wherein the two TPC command values are indicated respectively by an individual codepoint of the TPC command field.

4. The method of claim 1,
wherein whether two TPC command values for the two transmission occasion (TO) groups are indicated is determined by higher layer signaling by the base station.

5. The method of claim 2, further comprising:
receiving second configuration information related to power control,
wherein the configuration information includes two power control parameter sets associated with the two TO groups for the PUSCH transmissions, respectively.

6. The method of claim 5,
wherein PUSCH transmission power is determined based on a power control parameter set associated with a TO group that the PUSCH transmission is transmitted.

7. The method of claim 5,
wherein the power control parameter set includes at least one of an identifier (ID) of power (p0) configured by the base station, a pathloss reference signal (RS) identifier (ID) and/or a closed-loop index.

8. The method of claim 7,
wherein one or more parameters of the ID of the power (p0) by the base station, the pathloss RS ID and/or the closed-loop index configured are commonly configured for the two TO groups.

9. The method of claim 5,
wherein each of the two power control parameter sets correspond to different spatial relation information for the PUSCH transmissions or a channel state information reference signals (CSI-RSs) associated with the PUSCH transmissions.

10. The method of claim 5,
wherein based on the single DCI being received in a specific control resource set (CORESET) and/or a specific search space (SS) set configured by the configuration information, repeat transmission is configured at the plurality of TOs of the PUSCH transmissions based on the two TO groups.

11. The method of claim 10,
wherein repeat transmission of the PUSCH transmissions is performed based on repetition configuration information of a physical downlink control channel (PDCCH) carrying the single DCI.

12. The method of claim 10,
wherein a plurality of QCL (quasi co-location) reference signals are configured for a CORESET for receiving the single DCI, and
wherein as a spatial relation reference signal of PUSCH transmission, a QCL reference signal of the CORESET associated with a TO group that the PUSCH transmission is transmitted is used.

13. The method of claim 2,
wherein the plurality of TOs are cyclically mapped to the N TO groups in two TO units.

14. The method of claim 2,
wherein the plurality of TOs are cyclically mapped to the N TO groups in one TO unit.

15. A terminal operating in a wireless communication system, the terminal comprising:
at least one transceiver for transmitting and receiving a wireless signal; and
at least one processor controlling the at least one transceiver,
wherein the at least one processor is configured to:
receive, from a base station, first configuration information related to a physical uplink shared channel (PUSCH);
receive, from the base station, single downlink control information (DCI); and
transmit, to the base station, PUSCH transmissions,
wherein whether the single DCI includes one transmit power control (TPC) command value or two TPC command values is configured by the first configuration information,
wherein one TPC command value is indicated with a bit size of N bits (N is a natural number), and the two TPC command values is indicated with a bit size of 2*N bits, and
wherein based on i) the single DCI including two transmit power control (TPC) command values and ii) the PUSCH transmissions being associated with closed-loop indexes 0 and 1, the first TPC command value among the two TPC command values is applied for determining PUSCH transmission power for a closed-loop index 0 and the second TPC command value among the two TPC command values is applied for determining PUSCH transmission power for a closed-loop index 1.

16. A base station of receiving an uplink channel operating in a wireless communication system, the base station comprising:
at least one transceiver for transmitting and receiving a wireless signal; and
at least one processor controlling the at least one transceiver,
wherein the at least one processor is configured to:
transmit, to a terminal, first configuration information related to a physical uplink shared channel (PUSCH);
transmit, to the terminal, single downlink control information (DCI); and
receive, from the terminal, PUSCH transmissions,
wherein whether the single DCI includes one transmit power control (TPC) command value or two TPC command values is configured by the first configuration information,
wherein one TPC command value is indicated with a bit size of N bits (N is a natural number), and the two TPC command values is indicated with a bit size of 2*N bits, and
wherein based on i) the single DCI including two transmit power control (TPC) command values and ii) the PUSCH transmissions being associated with closed-loop indexes 0 and 1, the first TPC command value among the two TPC command values is applied for determining PUSCH transmission power for a closed-loop index 0 and the second TPC command value among the two TPC command values is applied for determining PUSCH transmission power for a closed-loop index 1.

\* \* \* \* \*